United States Patent
Sa-Ngasoongsong et al.

(10) Patent No.: US 12,491,029 B2
(45) Date of Patent: Dec. 9, 2025

(54) BONE FIXATION SYSTEM FOR HUMAN BONE, METHOD OF DESIGNING AND MANUFACTURING THEREOF

(71) Applicant: METICULY COMPANY LIMITED, Bangkok (TH)

(72) Inventors: Paphon Sa-Ngasoongsong, Bangkok (TH); Nachapan Pengrung, Bangkok (TH); Rahat Jarayabhand, Bangkok (TH); Boonrat Lohwongwatana, Bangkok (TH); Chedtha Puncreobutr, Bangkok (TH); Natthaphop Lakdee, Nonthaburi (TH); Natthaphat Viriya, Nonthaburi (TH); Kantapat Phakdeewisetkul, Nonthaburi (TH); Krit Rudeejaroonrung, Nonthaburi (TH); Korakod Srikong, Nonthaburi (TH); Techawit Hirisatja, Nonthaburi (TH)

(73) Assignee: METICULY COMPANY LIMITED, Bangkok (TH)

( * ) Notice: Subject to any disclaimer, the term of this patent is extended or adjusted under 35 U.S.C. 154(b) by 252 days.

(21) Appl. No.: 18/033,253

(22) PCT Filed: Oct. 21, 2020

(86) PCT No.: PCT/TH2020/000070
§ 371 (c)(1),
(2) Date: Apr. 21, 2023

(87) PCT Pub. No.: WO2022/086455
PCT Pub. Date: Apr. 28, 2022

(65) Prior Publication Data
US 2023/0397955 A1 Dec. 14, 2023

(51) Int. Cl.
*A61B 34/10* (2016.01)

(52) U.S. Cl.
CPC ........ *A61B 34/10* (2016.02); *A61B 2034/108* (2016.02)

(58) Field of Classification Search
CPC ..... A61B 34/10; A61B 17/80; A61B 17/8061; A61B 17/17; A61B 17/1728; A61B 17/1739
See application file for complete search history.

(56) References Cited

U.S. PATENT DOCUMENTS

| 2009/0275946 A1 | 11/2009 | Duncan |
| 2011/0184413 A1 | 7/2011 | Slater |

(Continued)

FOREIGN PATENT DOCUMENTS

| EP | 2838458 B1 | 9/2018 |

OTHER PUBLICATIONS

International Search Report issued in corresponding International Application No. PCT/TH2020/000070, dated Jul. 19, 2021 (5 pages).

(Continued)

*Primary Examiner* — Christopher J Beccia
(74) *Attorney, Agent, or Firm* — Osha Bergman Watanabe & Burton LLP

(57) ABSTRACT

A method of configuring a bone fixation system for a fracture of a human's long bone shaft, includes determining a fixator reference and a fixator dimension value. Determining the fixator reference is based on at least a bone reference, a fixator parameter, and the fixator dimension value. The fixator dimension value includes a function of a critical load value in accordance with a design formula, the design formula being based on a fracture parameter, a fixator parameter, and a body constraint value. The design formula is determined by searching a formula library. A plurality of (Continued)

design formulas are searchable by the fracture parameter, the fixator parameter, or the body constraint value.

39 Claims, 23 Drawing Sheets

(56) References Cited

U.S. PATENT DOCUMENTS

| | | |
|---|---|---|
| 2012/0059424 A1 | 3/2012 | Epperly et al. |
| 2013/0096560 A1 | 4/2013 | Wenk et al. |
| 2015/0051650 A1 | 2/2015 | Verstreken et al. |
| 2017/0035471 A1 | 2/2017 | Diao et al. |
| 2018/0203079 A1 | 7/2018 | Frigg et al. |
| 2018/0256224 A1 | 9/2018 | Govey et al. |

OTHER PUBLICATIONS

Written Opinion issued in corresponding International Application No. PCT/TH2020/000070, dated Jul. 19, 2021 (8 pages).
Hyong Nyun Kim et al., "Use of a real-size 3D-printed model as a preoperative and intraoperative tool for minimally invasive plating of comminuted midshaft clavicle fractures" Journal of Orthopaedic Surgery and Research, 2015, 10:91, pp. 1-6 (6 pages).

BONE FIXATION SYSTEM FOR HUMAN BONE, METHOD OF DESIGNING AND MANUFACTURING THEREOF

FIELD OF INVENTION

The present invention is related to bone fixation systems, particularly to those for use with human bone. Examples of such system include those having a bone plate and similar fixators.

BACKGROUND OF THE INVENTION

A fracture in a human patient's long bone shaft may arise from a number of possible causes, including a force trauma, and some injuries, defects, or diseases that otherwise deform the bone. In most cases, such fracture induces pain and impairs the patient's physical functions. The ensuing complications are usually serious because a fractured bone might also be dislocated. Medical handlings of the bone fracture may be grouped generally into non-invasive and invasive procedures. Non-invasive procedures involve fixators such as splints applied to the patient's external body part corresponding to the affected part of the bone, while invasive procedures involve surgery performed in order to insert and apply fixators, such as a bone plate, directly to the bone inside the patient's body. While invasive procedures enable a relatively precise treatment and/or correction, they are also associated with further risks including the damages occurring to the affected bone (particularly those caused by fastening the fixator to the bone by way of drilling and screwing) and tissues, organs, and other bones surrounding the affected site, thereby affecting the success or effectiveness of treatment and time of recovery, among others. Said risks are attributable to the invasiveness in itself, along with the mismatch of fixators used. Though standardized fixators for invasive procedures are commercially available in many sizes for selection, the design of such fixators does not take account of the individual patient's nature of bone, nature of the fracture, along with other patient-specific needs, and so fail to address the risks adequately. In many cases, the mismatch also increases the procedure's invasiveness, e.g. by entailing a wider, deeper, or more traumatic surgical wound, or a longer operation time, which further compounds the risks. Further, those commercially available fixators are prone to failure or deformation due to inadequate strength after being inserted into the patient's body, causing the need to perform another surgery.

There were attempts to address the abovementioned problem by various approaches. Notably, Kim et al. *Journal of Orthopaedic Surgery and Research* (2015) suggests using a 3D-printed replica of patient's bone to assist the selection of bone fixator and planning the operation.

Further, EP 2 838 458 B1 proposes bone fixation system which includes a bone plate comprising fixation features (e.g. threaded holes), and a positioning element (e.g. that having a form resembling a pin or peg) extending from the bone plate's surface for insertion into the bone through a drilled hole. Said bone plate is designed based on a 2D or 3D model of the relevant bone and thus has a portion of surface that matches the surface of relevant bone.

SUMMARY OF THE INVENTION

An object of the present invention is to provide a new system, along with a method of designing and manufacturing, of bone fixation systems capable of significantly improving the effectiveness of treatment of a fracture in a human's long bone.

An embodiment is a bone fixation system for a fracture of a human's long bone shaft, said fracture forming an effective fracture length defined by one or more effective fracture border. Said system comprises a fixator for supporting the long bone shaft, and a positioning guide. A fixator in accordance with an embodiment comprises a plurality of fastening locations adapted to accommodate a plurality of fasteners for attaching the fixator to the long bone shaft; one or at least one border marker adapted to coincide substantially with the effective fracture border when the fixator has been attached to the long bone shaft; a high-load portion adapted to be free of the fastening location; and a thickness profile that is non-uniform and adapted so that the strength of fixator is substantially at a predetermined safety factor. Said fixator has patient-specific configuration; and said positioning guide comprises at least one fixator-end marker adapted to coincide substantially with one end of the fixator; a plurality of fastening markers adapted to coincide substantially with the fastening locations; and at least one bone-end marker adapted to coincide substantially with a predetermined position of the long bone end when the fixator has been attached to the long bone shaft.

In another aspect, said high-load portion is adapted to provide mechanical support to the effective fracture length when the fixator has been attached to the long bone shaft. Preferably, such support extends to the zone adjacent to the effective fracture length as well. The high-load portion is further adapted to be free of the fastening location so as to be capable of sustaining the heightened mechanical stress exerted upon such portion during the intended use (i.e. after being inserted and attached into the patient's body). Said mechanical stress is a likely cause of failure of the pre-existing commercially available fixators. Preferably, said thickness profile of the fixator is adapted so that the average thickness along the high-load portion is greater than that along the remaining portion of the fixator.

In another aspect, said at least one border marker is adapted so as to assist an operating surgeon in locating the effective fracture length and/or effective fracture borders. This synergistically enhances the effectiveness of treatment and reduces the time of operation. According to this aspect, the border markers could be adapted into many forms depending on the case of fracture. Non-limiting examples of such forms include a protrusion, which could be pointed or rounded; a groove, which could be smooth or edged; an irregular shape to engage the relevant bone, and so on.

In a further aspect, said at least one fixator-end marker is adapted so as to assist an operating surgeon in precisely positioning the fixator upon the long bone shaft by providing a reference location of the fixator's ends that is ascertainable substantially from outside the patient's body. This synergistically enhances the effectiveness of treatment and reduces the invasiveness and time of operation. According to this aspect, the fixator-end marker could be adapted into many forms depending on the case of fracture and nature of the fixator. For non-limiting examples, the fixator-end marker may be aligned at any angle or positioned at any side of the positioning guide, and in cases that the positioning guide has more than one fixator-end markers, the fixator-end markers may be aligned in parallel or otherwise, or positioned at different anatomical positions (e.g. one fixator-end marker facing the anterior side; another one facing the superior side).

In a further aspect, said plurality of fastening markers are adapted so as to assist an operating surgeon in precisely attaching the fixator to the long bone shaft by providing reference locations of the fastening locations that are ascertainable substantially from outside the patient's body. This synergistically enhances the effectiveness of treatment and reduces the invasiveness and time of operation. According to this aspect, the fastening markers could be adapted into many forms depending on the case of fracture and nature of fasteners. Preferably, the form of fastening markers corresponds to the shape of fastening locations. For non-limiting example, when the fastening locations are round openings (e.g. screw holes or pin holes) then the fastening markers preferably take the form of cylindrical protrusions, each having the cross-sectional area substantially equal to each of said round openings.

In a further aspect, said at least one bone-end marker is adapted so as to assist an operating surgeon in precisely disposing the long bone shaft by providing a reference location of the correct or otherwise treatment-relevant alignment of the long bone end that is ascertainable substantially from outside the patient's body. This synergistically enhances the effectiveness of treatment and reduces the invasiveness and time of operation. According to this aspect, the bone-end marker could be adapted into many forms depending on the case of fracture. Non-limiting examples of such forms include spherical, cubic, and prismatic shapes.

Said safety factor is predetermined based on the circumstantial requirements of the fracture and needs of individual patient's needs. For non-limiting example, said safety factor is preferably at least 1.5 and more preferably at least 2.

Said patient-specific configuration improves further the matching between the bone fixation system and the patient's individual needs. Preferably, the patient-specific configuration includes one or more of: the fixator's outline, thickness profile, number of fastening locations, position of fastening locations, and position of border marker.

As envisioned by the present inventors, some foreseeable circumstances may constrain the freedom to configure the thickness profile of the fixator so that its strength is substantially at a predetermined safety factor. Examples of factors that might influence such circumstances include the nature or position of fracture and the patient's physical needs. In that case, the intended strength and/or safety factor may be achieved by configuring the fixator's width profile in addition to its thickness profile. Preferably, the fixator comprises a width profile that is non-uniform and adapted so that the strength of the fixator is substantially at said predetermined safety factor.

In an embodiment, the fixator further comprises one or more pilot fastening location adapted to accommodate a pilot fastener. Said pilot fastener provides a temporary fastening action between the fixator and the long bone shaft at the fewest locations possible, enabling an operating surgeon to quickly and temporarily attach the fixator to the bone and assess the positioning before proceeding to the apply the fasteners to the fastening locations for permanent attachment. Preferably, said pilot fastener is a small wire, and said pilot fastening location is a small hole.

In an embodiment, the bone-end marker is of a substantially spherical shape. Said substantially spherical shape utilizes further the bone-end marker as a reference object to help calibrate the magnification of the diagnostic radiology technique being implemented in the operation.

In an embodiment, the fastening locations are holes, and the fasteners are screws.

In a further embodiment, the bone fixation system further comprises one or more drilling guide adapted to be temporarily fitted on a surface area of the long bone shaft, said drilling guide having an opening so as to allow a drilling means of predetermined dimension to pass therethrough. The drilling guide provides the system in accordance with the present invention with means for facilitating the pre-drilling into the relevant long bone shaft before applying the screws, thereby reducing further the likelihood of error.

Preferably, the drilling guide comprises a primary base adapted to be temporarily fitted on the surface area of the long bone shaft, and a secondary base adapted to have an opening so as to allow a drilling means of predetermined dimension to pass therethrough, wherein said primary base and said secondary base are adapted to be detachably attached to each other. This way, the drilling guide's main functions are divided into those related to the fitting temporarily on the surface area of the long bone shaft, which are embodied in the primary base; and those related to providing the means to allow the drilling means to pass therethrough, which is embodied in the secondary base. Such division and grouping of functions provides the bone fixation system with further flexibility during the actual use.

Preferably, the drilling guide is further adapted to have a contacting surface which substantially corresponds with the surface area of the long bone shaft. This embodiment provides the drilling guide with an even more improved fitting and more precise positioning on the long bone shaft.

Preferably, the drilling guide is further adapted to engage one end of the fixator. This embodiment further utilizes the drilling guide to assist an operating surgeon in precisely positioning the fixator upon the long bone shaft by providing an additional reference location of the fixator's end, thereby further reducing the operation time and likelihood of error.

Preferably, the drilling guide further comprises a drill-stopping element so as to allow the drilling means to pass therethrough up to a predetermined distance.

In an embodiment that the fixator further comprises one or more pilot fastening location adapted to accommodate a pilot fastener and the fastening locations are holes and the fasteners are screws, it is preferred that the system further comprises one or more drilling guides adapted to be temporarily fitted on a surface area of the long bone shaft, said drilling guide having a pre-drilling opening so as to allow a drilling means of predetermined dimension to pass therethrough; and a pilot opening so as to allow a pilot fastener of predetermined dimension to pass therethrough.

As envisioned by the present inventors, the positioning guide's features that are capable of providing the operating surgeon with relevant reference locations that are ascertainable substantially from outside the patient's body could be improved further in their utility by being configured to be observable through a diagnostic radiology technique, including X-ray fluoroscopy, computed tomography (CT) and magnetic resonance imaging (MRI). Preferably, the positioning guide is substantially radiopaque. Even more preferably, the positioning guide is substantially radiopaque specifically at said feature, including the fixator-end marker, the fastening marker, and the bone-end marker.

In an embodiment, the human long bone is a clavicle.

Further embodiments include: a novel method of configuring a bone fixation system for a fracture of a human's long bone shaft that is necessary to enable the abovementioned exemplary systems in accordance with the concept of present invention; a novel method of generating a model for computer-aided manufacture based on said method of configuring a bone fixation system; and a process of manufacturing a bone fixation system based on said model for computer-aided manufacture.

An embodiment is a method of configuring a bone fixation system for a fracture of a human's long bone shaft, said method comprising determining a fixator reference and a fixator dimension value. Determining said fixator reference is based on at least: a bone reference, a fixator parameter, a fastening parameter, and said fixator dimension value. Said fixator dimension value comprises a function of a critical load value in accordance with a design formula, said design formula being based on a fracture parameter, a fixator parameter, and a body constraint value.

Preferably, the fixator dimension value comprising a function of a critical load value in accordance with the design formula is selectable from: the fixator's width profile and the fixator's thickness profile.

Preferably, the design formula is determined by searching a formula library wherein a plurality of design formulas are searchable by the fracture parameter, the fixator parameter, or the body constraint value. More preferably, said plurality of design formulas are predetermined by carrying out numerical simulations. Even more preferably, the formula library is pre-loaded on a computer-readable storage medium. In a further embodiment wherein the body constraint value comprises a maximum limit of the fixator dimension value, the design formula is determined preferably so as to also maximize the normalized difference between (a) the body constraint value and (b) the fixator dimension value. Such further embodiment is provided to accommodate an event that searching in the library finds more than one of applicable design formulas (e.g. when not all the relevant parameters/values have been specified); in such cases, the design formula which maximizes said normalized difference would provide the most comfort to the patient with the least consumption of material, and thus is preferred.

In an embodiment, the bone reference is a visualized simplified shape representing one or more of the following features of the long bone: end plane, effective fracture plane, one or more surface areas of the long bone shaft, and the middle curvature of one or more surface areas of the long bone shaft.

In an embodiment, the fracture parameter includes: the type of long bone being fractured, the type of fracture, and the condition of fracture; said type of long bone being selectable from: clavicle, humerus, radius, ulna, femur, fibula, tibia; said type of fracture being selectable from: simple and comminuted; and said condition of fracture being selectable from: new, malunion, and non-union.

In an embodiment, the bone fixation system comprises at least one of: a fixator and a surgical assisting kit, said fixator comprising a fastening zone wherein a plurality of fastening locations are located, said fastening locations being adapted to accommodate a plurality of fasteners; and said surgical assisting kit comprising one or more of a positioning guide and a drilling guide. In such embodiment, the fixator parameter may include: the fixator's safety factor, the fixator's orientation, the fixator's shape condition, the fixator's material, the fastening parameter, and the fixator dimension value. Further, in such embodiment, the fixator reference may be a visualized simplified shape representing one or more of the following features of the fixator: end plane, middle curvature, cross-sectional plane, the fastening location's countersink plane, and the fastening location's axis. Further, in such embodiment, the body constraint value may be selectable from: the fixator's maximum thickness limit, the fixator's maximum width limit, and the fastening zone's maximum length limit.

Said fixator's orientation may be one or a combination of anatomical position corresponding with the fixator, said anatomical position may be selectable from: superior, inferior, anterior, antero-inferior, antero-medial, antero-lateral, lateral, and posterior sides.

Said fastening parameter may be selectable from: the type of fastening locations, the number of fastening locations, and the constellation of fastening locations.

Said fixator dimension value may be selectable from the fixator's length, the fastening zone's length, the distance between the fastening locations, the fixator's width profile, and the fixator's thickness profile.

In a further embodiment, the critical load value may be selectable from: a bending moment, torsion force, and axial compression force. Preferably, said critical load value is vectorial. Also preferably, said critical load value is a function of the bone dimension value, the fixator dimension value, and the physiologic loading parameter.

In a yet further embodiment, the bone dimension value may be selectable from: the long bone's effective fracture length, the length of the middle curvature of the long bone shaft's flat surface, and the long bone shaft's width profile in the perspective of relevant anatomical position. Preferably, said bone dimension value is determined based on the bone reference. Also preferably, said physiologic loading parameter is based on a body parameter or an activity parameter. More preferably, said body parameter includes one or more of: the patient's age and biological sex. Also more preferably, said activity parameter includes one or more of: the patient's occupation and sport activity.

Preferably, the method of configuring a bone fixation system is computer-automated or computer-aided.

A yet further embodiment is a method of generating a model for computer-aided manufacture of a bone fixation system, said model being based on at least the fixator reference and the fixator dimension value in accordance with any of the above embodiments. Preferably, such method of generating a model comprises modifying a fixator basic unit with at least the fixator reference and the fixator dimension value. More preferably, said fixator basic unit comprises the pre-loaded (a) shape of the fixator's cross-section area and (b) shape of the fastening locations.

An even further embodiment is a process of manufacturing a bone fixation system in accordance with at least the model as per any of the above embodiments. Said process preferably comprises additive manufacturing.

BRIEF DESCRIPTION OF DRAWINGS

The principle of the present invention and its advantages will become apparent in the following description, taking into consideration the accompanying drawings in which.

DETAILED DESCRIPTION OF EMBODIMENTS OF THE INVENTION

Figure 1:
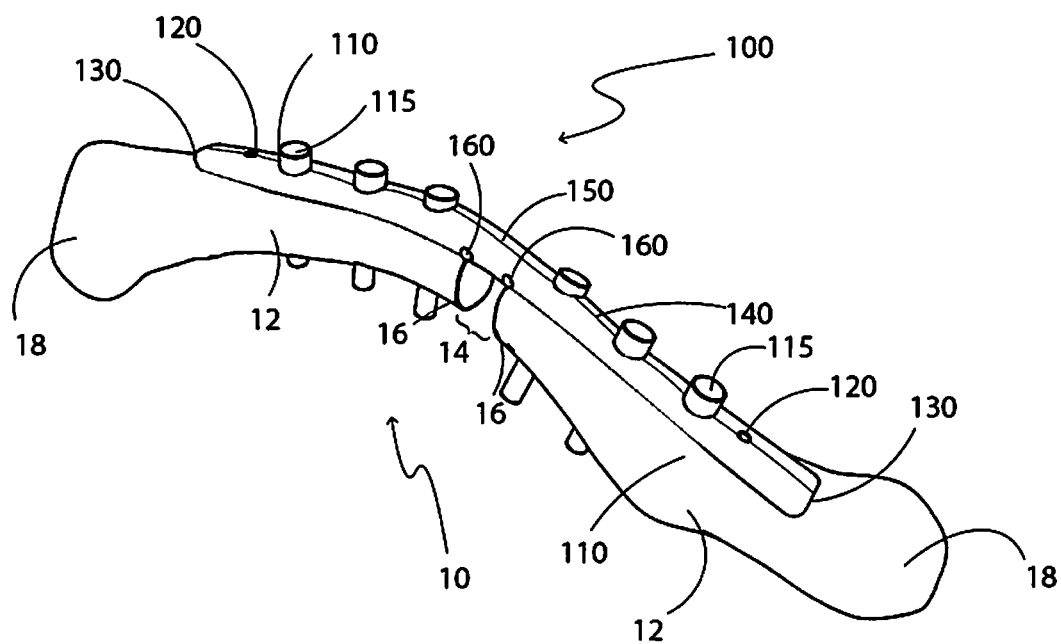
FIG. 1 shows a perspective view of a fixator which is part of a bone fixation system in accordance with a preferred embodiment (not to scale).

It is to be understood that the following detailed description will be directed to embodiments, provided as examples for illustrating the concept of the present invention only. The present invention is in fact not limited to particular embodiments described, as such may, of course, vary. It is also to be understood that the terminology used herein is for the purpose of describing particular embodiments only, and is not intended to be limiting, since the scope of this invention will be limited only by the appended claims.

The detailed description of the invention is divided into various sections only for the reader's convenience and disclosure found in any section may be combined with that in another section.

Unless defined otherwise, all technical and scientific terms used herein have the same meaning as commonly understood by one of ordinary skill in the art to which this invention belongs.

It must be noted that as used herein and in the appended claims, the singular forms "a", "an", and "the" include plural referents unless the context clearly dictates otherwise.

The term "about" when used before a numerical designation, e.g., dimensions, time, amount, and such other, including a range, indicates approximations which may vary by (+) or (−) 10%, 5% or 1%, or any sub-range or sub-value there between.

"Comprising" or "comprises" is intended to mean that the compositions and methods include the recited elements, but not excluding others. "Consisting essentially of" when used to define compositions and methods, shall mean excluding other elements of any essential significance to the combination for the stated purpose. Thus, a device or method consisting essentially of the elements as defined herein would not exclude other materials or steps that do not materially affect the basic and novel characteristic(s) of the claimed invention. "Consisting of" shall mean excluding more than trace elements of other ingredients and substantial method steps. Embodiments defined by each of these transition terms are within the scope of this invention.

"Patient-specific configuration" refers to one or more configuration applicable to a specified feature of embodiment that is specific to an individual patient's needs. For avoidance of doubt, the term is intended to cover configurations directly apparent from an image of the bone affected by the fracture and the other bones (e.g. fracture location and surface topology), as well as those obtainable by processing any information originating from the patient (e.g. number and position of fastening locations determined based on the anatomical position of the affected bone), so long that such configuration may be applied to part of an embodiment.

"Long bone" is intended to mean a bone of any part of the body that has the length that is substantially greater than its width, most of said length forming a "shaft" located between and adjacent to "ends" of the bone. Examples of a long bone include clavicle, humerus, and femur. Said "shaft" is intended to cover any location between the ends. Therefore, "long bone shaft" is intended to include "mid-shaft" and "near-end" locations of the long bone.

"Effective fracture length" is intended to mean a length defined by the portion of the bone that is significantly affected by the cause of fracture. Such portion covers the fractured site directly and in many cases extends to the nearby site of which the bone's structure and/or disposition is significantly destabilized by the cause of fracture. Non-limiting examples include a scenario of pathologic fracture wherein the part of bone that is adjacent to the actual fracture, though unbroken, is structurally weakened. In such case, the effective fracture length would cover the actual fracture as well as the unbroken part that sustains the structural weakness.

"Effective fracture border" is intended to mean a border lying about between the effective fracture length and the rest of the bone, i.e. about between the 'normal' part and the 'defective' part of the fractured bone. While it is normally perceived that for a case of bone fracture, two effective fracture borders would be located, that is not always the case. In fact, the count of effective fracture borders is not essential to the concept of the present invention. The present inventors envision that embodiments according to the present invention may be applied as well whether the number of effective fracture border is fewer or greater than two. As a non-limiting example, in a scenario of complete, simple fracture occurring at the mid-shaft location of humerus, two effective fracture borders would likely be located: one laying superior to the fracture, and another laying inferior to the fracture. In such case, the bone's length across the effective fracture borders would be the effective fracture length.

"Fixator reference" is intended to mean a means for visualizing a simplified shape and/or defining characteristic planes of the fixator so as to help determine the location at which the fixator dimension value is applied. Said means may be of any suitable shape, and is configured based on the circumstances of the patient and the nature of fixator. As non-limiting examples, the fixator reference includes the fixator's end planes, a set of planes which determine the fixator's cross-section position, a straight line which determines the screw hole's axis, a plane which determines the depth of screw countersunk hole, and the fixator's middle curvature which connects the middle points of the lower boundaries of the fixator's cross sections.

"Fixator parameter" is intended to mean a qualitative or quantitative variable representing the fixator's characteristic features. Non-limiting examples include the safety factor, the fixator's material, the "fixator shape condition", the "fixator dimension value", the "fastening parameter", and the "fixator's orientation".

"Safety factor" is intended to mean a quantitative value representing a ratio of an article's actual mechanical load capacity to said article's necessary mechanical load capacity.

"Fixator shape condition" is intended to mean a fixator parameter which is a qualitative value representing the fixator's characteristic feature related to the shape thereof. Non-limiting examples include the conditions that the fixator is fixed or varied in the thickness or width; and if varied, the type of profile along with such variation follows.

"Fixator dimension value" is intended to mean a fixator parameter which is a quantitative value representing the fixator's characteristic dimensions, including those defining the fixator's outlines and other features. According to the concept of the present invention, said parameter is obtainable based on the bone dimension value, based on other fixator's parameters, the design formula (see further below), and/or the surgeon's customization. As non-limiting examples, the fixator dimension value includes the fixator's length along the middle curvature on the surface of the relevant bone, the fastening zone's length, the distance between fastening locations, and the fixator's thickness and/or width profile along the fixator's length. In particular, the "fastening zone" is intended to mean the fixator's portion within which all the fastening locations are located.

"Fastening parameter" is intended to mean a fixator parameter which is a qualitative or quantitative variable representing the fixator's characteristic feature related to the fastening thereof. Non-limiting examples include the type of fastening locations, the number of fastening locations, and the constellation of fastening locations. In particular, the "constellation of fastening locations" mean the outline along which a plurality of fastening locations is formed. Non-limiting examples of the constellation of fastening locations include: in-line and triangle-end. Further, non-limiting examples of the type of fastening location include: non-threaded and threaded.

"Fixator's orientation" is intended to mean a fixator parameter which represents the anatomical position corresponding with the fixator (i.e. at which the fixator is intended to be applied).

"Bone reference" is intended to mean a means for visualizing a simplified shape and/or defining characteristic planes of a bone so as to assist the determination of bone dimension value. Said means may be of any suitable shape, and is configured based on the circumstances of the patient, usually including the type of bone and the nature of fracture. As a non-limiting example, for a case of straight and uniform long bone, the bone reference is a visualized continuous rectangular plane having a length such that its both ends may coincide substantially with the long bone's extreme ends, and a width that correspond substantially with the long bone's width. As another non-limiting example, for a case of curved and tapered long bone, the bone reference is an assembly of visualized discrete rectangular planes to coincide substantially with the long bone's ends and different portions having different widths. As yet further non-limiting example, if said long bone is fractured, the bone reference preferably includes at least a visual plane to coincide with the effective fracture border.

"Bone dimension value" is intended to mean a quantitative value representing a bone's characteristic feature, particularly that relevant to the configuration of the fixator. Accordingly, said parameter refers particularly to that of the long bone in its correct or otherwise treatment-relevant alignment. The bone dimension value is preferably determined with assistance of the bone reference. As non-limiting examples, the bone dimension value includes the portion of the bone that is significantly affected by the cause of fracture (see also the "effective fracture length", above, which refers to the length of such portion), the middle curvature along the relevant surface of the relevant bone, and a set of the width values of the relevant surface of the relevant bone.

"Fracture parameter" is intended to mean a qualitative or quantitative variable which characterizes the long bone being fractured. Non-limiting examples include: the type of long bone being fractured, the type of fracture, and the condition of fracture. Said type of long bone may be selectable from: clavicle, humerus, radius, ulna, femur, fibula, and tibia; said type of fracture may be selectable from: simple and comminuted; and said condition of fracture may be selectable from: new, malunion, and non-union.

"Fixator basic unit" is intended to mean a fixator's specified feature, along with its configuration, which is made available at a preset value, and, upon the application of fixator dimension value, may be further modified and/or assembled to form a model of fixator. Non-limiting examples include the shape outline of fixator's cross-section area and the shape of screw hole. For further non-limiting example, some embodiments may provide that the fixator's basic unit includes the shape of the fixator's cross-section area and the shape of the screw hole, and further preset said fixator's cross-section area to have a semicircular shape and the screw hole to be a hollow cylinder, all having their default dimensions. After applying the relevant fixator dimension values, the radius of cross-section area varies along the length of fixator at a specified rate; and the number, radius, and depth of screw holes are determined.

"Body constraint value" is intended to mean a quantitative value, determined by the patient's physical limitation, and by which the configuration of bone fixation system is constrained. Non-limiting examples of such physical limitation include where a patient is of a slender physique or has a thin outer skin, and thus the relevant bone fixation system is preferably designed so that the fixator, when attached, minimally stretches the skin in the outward direction so as to reduce the discomfort or risk of injury. In such an example case, the body constraint value is normally the maximum thickness and/or width limit of the fixator.

"Critical load value" is intended to mean a quantitative value, which in some embodiments a vectorial value, which represents the mechanical load causing an article's critical mode of failure. Non-limiting examples include a bending moment, a torsion force, and an axial compression force related thus to the critical mode of failure.

"Design formula" is intended to mean an expression representing a relationship between a value relevant to the configuration of bone fixation system and the critical load value. Non-limiting examples include a linear equation wherein the critical bending moment is the independent variable and the fixator's maximum width at a certain safety factor is the dependent variable.

"Physiologic loading parameter" is intended to mean a qualitative or quantitative variable which characterizes the patient's physiologic features and affects the critical load value. The physiologic loading parameter may be derived from features intrinsic to the patient's body (i.e. "body parameter") or those arising from the patient's lifestyles (i.e. the "activity parameter").

"Body parameter" is intended to mean a physiologic loading parameter derived from a feature intrinsic to the patient's body. Non-limiting examples include the patient's age, weight, BMI, and biological race and sex.

"Activity parameter" is intended to mean a physiologic loading parameter derived from the patient's lifestyles. Non-limiting examples include the patient's occupation and sport activity.

"Y is a function of X" is intended to mean a relationship whereby an input of X entails an output of Y, regardless of whether X or Y is a single value or a set of values comprising same or different types of value, and regardless of the manner of such entailment. For non-limiting example, each of the following alternatives falls within the meaning of "Y is a function of X": (1) Y is calculated from X; (2) Y corresponds to X in a lookup table; and (3) Y is determined from X based on a set of logic operators. The following description will be directed to a preferred embodiment in which instances of "Y is a function of X" are implemented by preferred alternatives within this meaning.

The Bone Fixation System

FIG. 1 shows a perspective view of a fixator which is part of a bone fixation system in accordance with a preferred embodiment. In this embodiment, a fractured long bone 10 is a clavicle having a long bone shaft 12 and two long bone ends 18, said long bone shaft 12 sustaining a fracture which causes an effective fracture length 14 defined by two effective fracture borders 16. Here, the long bone's 10 relevant anatomical position is the superior side. Upon the surface at about the middle of said superior side, the long bone shaft 12 is intended to be mounted and attached with a fixator 100 which in this embodiment takes the form of a bone plate. In this embodiment, the fixator 100 comprises six fastening locations 110, which in this embodiment take the form of countersunk holes to accommodate six fasteners 115, which in this embodiment are screws for attaching the fixator 100 to the long bone shaft 12. Said six fastening locations 110 are divided evenly into two groups of three fastening locations 110, said two groups being situated substantially along the fixator's middle curvature 140 and oppositely across a high-load portion 150, which is a continuous portion of the fixator 100 that is free of the fastening location 110. Under the fixator 100 per this embodiment, there are two border markers 160 intended to be sitting upon the surface of the long bone shaft 12 such that each of said border markers 160 coincides substantially with each of the effective fracture borders 16 when the fixator 100 has been attached to the long bone shaft 12. FIG. 1 further shows the fixator 100 as preferably having two pilot fastening locations 120, which in this embodiment takes the form of small holes to accommodate two pilot fasteners 125 (shown later in FIG. 5) which in this embodiment takes the form of wires. Each of said two pilot fastening locations 120 has a smaller diameter than that of the fastening locations 110 and is situated substantially along the fixator's middle curvature 140 so as to be closer to a fixator's end 130 than its adjacent fastening location 110.

Figure 2A:
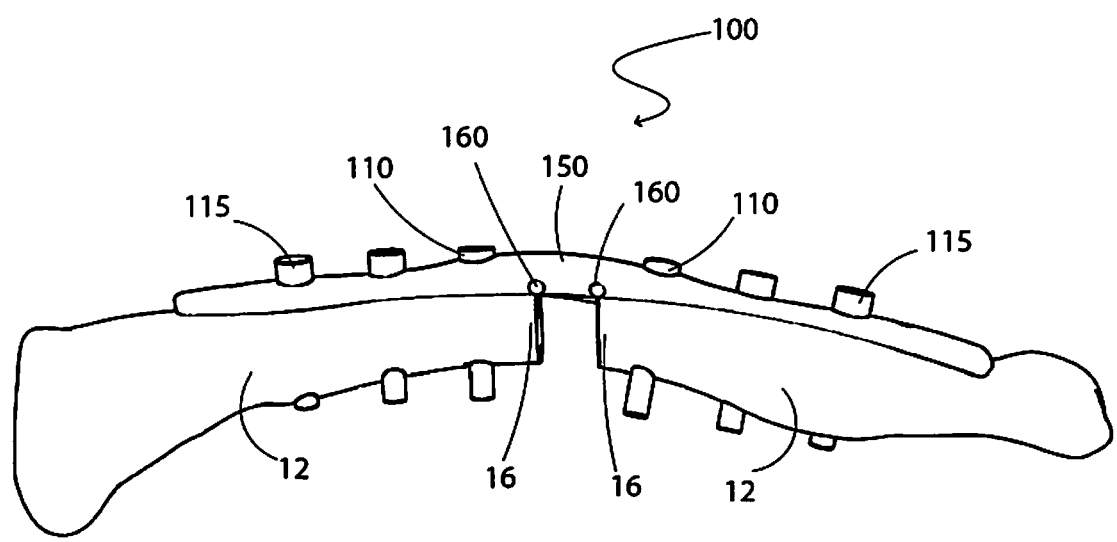
FIG. 2A shows a side view of a fixator which is part of a bone fixation system in accordance with a preferred embodiment (not to scale).

FIG. 2A shows a side view of a fixator which is part of a bone fixation system in accordance with a preferred embodiment. In particular, FIG. 2 shows the same fixator 100 as FIG. 1 being attached to the long bone shaft 12 as intended: each of the six fasteners 115 being inserted through each of the six fastening locations 110 and fitted through the long bone shaft 12; and each of the two border markers 160 contacts, and coincides substantially with, each of the effective fracture borders 16. In this embodiment, the border markers 160 take the form of a rounded protrusion from the fixator 100. In this preferred embodiment, FIG. 2A further shows the fixator's 100 thickness profile that is non-uniform and adapted so that the strength of fixator is substantially at a predetermined safety factor, which in this preferred embodiment the safety factor is predetermined to be 2. In this embodiment, said thickness profile is preferably greater around the high-load portion 150, and more preferably said greater thickness profile extends to the zone around the fastening locations 110 that are adjacent to the high-load portion 150 as well. As shown in FIG. 2A, the increase of thickness preferably follows a substantially smooth profile.

Figure 2B:
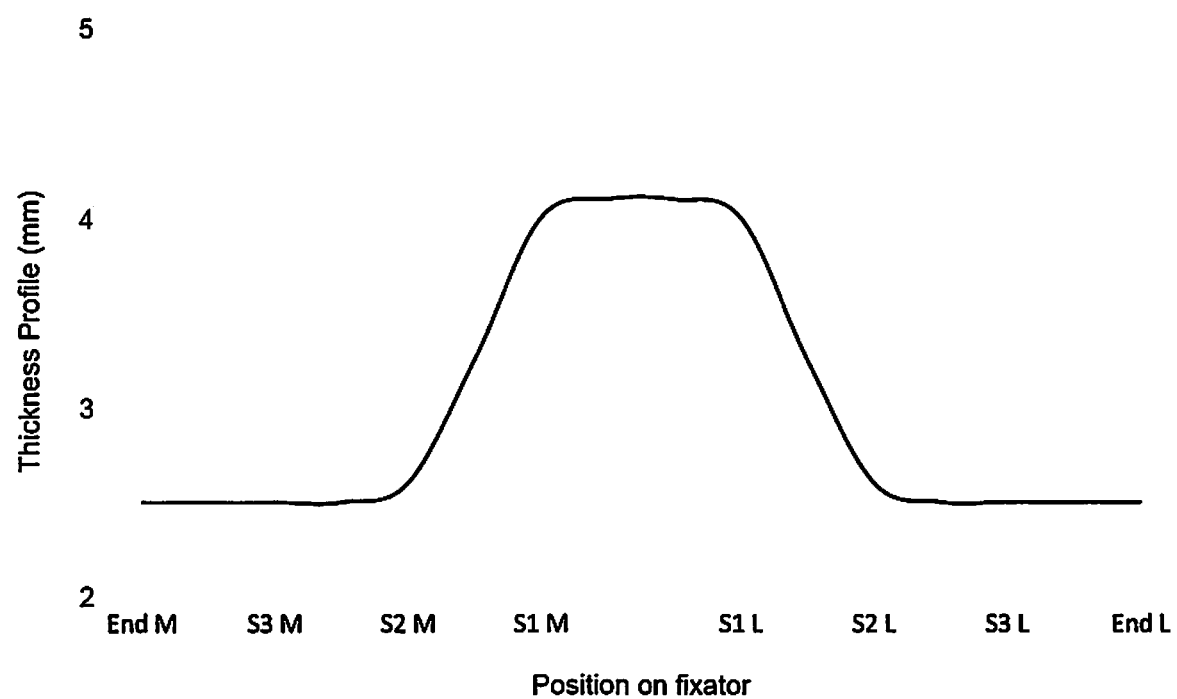
FIG. 2B shows a diagram representing the thickness profile when observed from a side view of a fixator which is part of a bone fixation system in accordance with a preferred embodiment (not to scale).

FIG. 2B shows a diagram representing the thickness profile when observed from a side view of a fixator which is part of a bone fixation system in accordance with a preferred embodiment. "L" and "M" indicated along the X-axis in FIG. 2B represent the "lateral" and "medial" anatomical position of the long bone 10, respectively; and the numbers following said "L" and "M" represent the locations corresponding to the fastening locations 110 ordered by their proximity to the border markers 160, "1" being the closest and "3" being the farthest from the border markers 160 (i.e. closest to the fixator's end 130). Here, the thickness profile elevates from 2.5 mm to 4.0 mm. Said elevation follows the "plateaued" type of profile and covers from S2M to S2L, i.e. from the second fastening location on the medial side to the second fastening location on the lateral side). It is to be noted that the foregoing representations are merely incidental to the present example case of fracture for the purpose of illustrating this preferred embodiment, and thus by no means limiting the scope of present invention. In other cases of long bone fracture, the alphabetical representation could be adapted to stand for any one of "superior", "inferior", "anterior", "posterior", "proximal", "distal", etc. For the same reason, the count of numerical representation in other cases of fracture could be fewer or more than "1", "2", and "3" and does not need to be equal for both sides.

The fixator 100 in accordance with the above FIGS. 1, 2A, and 2B preferably embodies patient-specific configurations. In this preferred embodiment, said patent-specific configurations are the outline, the thickness profile, the number of fastening locations 110, the position of fastening locations 110, and the position of border markers 160. These configurations are patient-specific because they are designed based upon each patient's activity information (which includes occupation and sports) and bodily information (which includes race, biological sex, age, weight, height, and BMI) along with the nature of relevant long bone and facture. The detail of designing method will be described further below.

Figure 3:
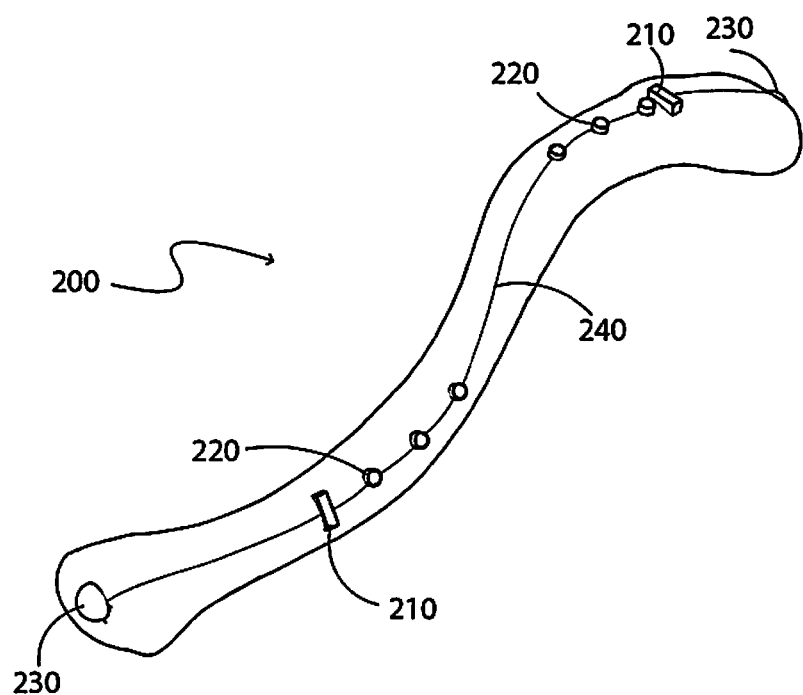
FIG. 3 shows a perspective view of a positioning guide which is part of a bone fixation system in accordance with a preferred embodiment (not to scale).

FIG. 3 shows a perspective view of a positioning guide which is part of a bone fixation system in accordance with a preferred embodiment. In particular, a positioning guide in FIG. 3 is part of a bone fixation system comprising a fixator in accordance with the above FIGS. 1, 2A, and 2B. Thus, a positioning guide in FIG. 3 is intended for a fractured long bone which is a clavicle having a long bone shaft which sustains a fracture which causes an effective fracture length defined by two effective fracture borders; and the long bone's relevant anatomical position is the superior side. In this preferred embodiment, a positioning guide 200 takes the form of a substantial model of the long bone 10 (not shown) in accordance with its correct (i.e. non-fractured) alignment. Said positioning guide 200 comprises two fixator-end markers 210, six fastening markers 220, and two bone-end markers 230. The fixator-end markers 210 and the fastening markers 220 are at the positions corresponding to the long bone shaft 12 (not shown), while the bone-end markers 230 are at the positions corresponding to the long bone ends 18 (not shown). Said fixator-end markers 210, fastening markers 220, and bone-end markers 230 are preferably radiopaque.

In this preferred embodiment, the fixator-end marker 210 takes the form of a protrusion from the positioning guide 200, said fixator-end marker 210 being substantially rectangular so as to correspond with the outline of the fixator's end 130 according to the above FIGS. 1, 2A, and 2B. In this embodiment, said fixator-end marker 210 protrudes significantly more than the fastening markers 220. The two fixator-end markers 210 protrude substantially perpendicularly from, and are placed substantially along, the positioning guide's middle curvature 240 at predetermined angles and intervening distance such that, when the positioning guide 200 is superimposed over the fixator 100, each of said fixator-end markers 210 is able to coincide substantially with each of the fixator's ends 130.

FIG. 3 further shows the fastening marker 220 taking the form of a knob protruding from the positioning guide 200, said fastening marker 220 being substantially cylindrical so as to correspond with the outline of the fastening location 110 according to the above FIGS. 1, 2A, and 2B. In this embodiment, said fastening marker 220 protrudes significantly less than the fixator-end marker 210. The six fastening markers 220 protrude substantially perpendicularly from, and are placed substantially along, the positioning guide's middle curvature 240 at predetermined positions and predetermined distances from each other such that, when the positioning guide 200 is superimposed over the fixator 100, each of the six fastening markers 220 is able to coincide substantially with each of the six fastening locations 110.

Moreover, FIG. 3 shows the bone-end marker 230 taking the form of a knob protruding from the positioning guide 200, said bone-end marker 230 being preferably substantially spherical so that it may be utilized further as a reference object to help calibrate the magnification of the diagnostic radiology technique being implemented in the operation, which in this embodiment said diagnostic radiology technique is X-ray fluoroscopy. The two bone-end markers 230 protrude substantially along the positioning guide's middle curvature 240 such that, when the positioning guide 200 is superimposed over the fixator 100, the two hone-end markers 230 is able to coincide substantially with predetermined positions of the long bone ends 18 (not shown) when the fixator 100 (not shown) has been attached to the long bone shaft 12 (not shown). In this preferred embodiment, said predetermined positions of the long bone ends 18 are relevant to the treatment in that they are substantially the original positions of the long bone ends 18 before the long bone shaft 12 sustained the fracture which dislocated the long bone ends 18.

Figure 4:
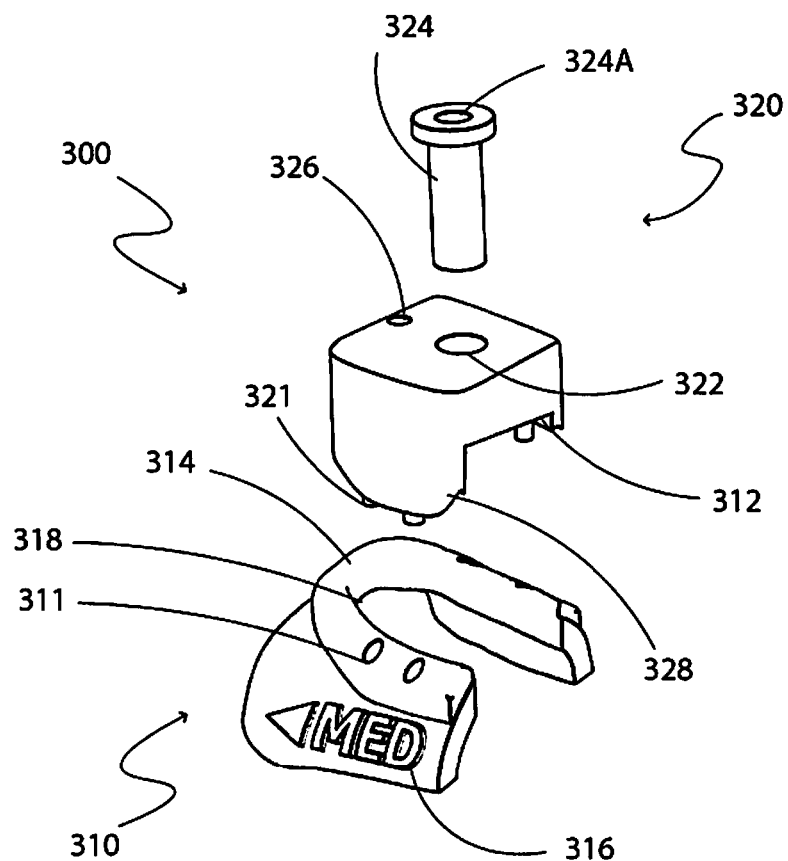
FIG. 4 shows a perspective view of a drilling guide which is part of a bone fixation system in accordance with a preferred embodiment (not to scale).

Next, FIG. 4 shows a perspective view of a drilling guide which is part of a bone fixation system in accordance with a preferred embodiment. In this embodiment, a drilling guide 300 comprises a primary base 310 and a secondary base 320. In this preferred embodiment, the primary base 310 and the secondary base 320 are adapted to be detachably attached to each other by way of providing the primary base 310 with a set of pinholes 311 and providing the secondary base with a set of pins 321 to be inserted into the corresponding pinholes 311. Said primary base 310 comprises further a contacting surface 312, a fixator abutment 314, an anatomy label 316, and a primary ridge 318; said secondary base 320 comprises further a pre-drilling opening 322, a drill-stopping element 324, a pilot opening 326, and a secondary ridge 328. While it is apparent from this preferred embodiment that the drilling guide 300 is divided into the primary base 310 of which main functions relate to fitting temporarily on the surface area of the long bone shaft and providing the positional references, and the secondary base 320 of which main function relates to providing the means to allow a drilling means of predetermined dimension to pass therethrough, along with other means related to drilling and/or attachment of the fixator, such functional division and grouping is merely incidental to this preferred embodiment and by no means essential to the concept of the present invention. Indeed, an alternative embodiment which is configured otherwise shall be described fully later on.

In this preferred embodiment, the primary base 310 takes the form of a bracket which is of a substantially open annular shape, to be temporarily fitted on the surface area of the long bone shaft 12 (not shown). Further, the secondary base 320 takes the form of a bracket which is of a substantially open block shape. In this embodiment, the secondary base 320 is intended to be mounted upon the primary base 310 such that the pins 321 are inserted into the pinholes 311 and the secondary ridge 328 contacts the primary ridge 318. To increase the mounting surface areas and thereby promoting the stability when accordingly mounted, the primary ridge 318 and the secondary ridge 328 are preferably configured to correspond with each other. The pins 321 and the pinholes 322 provide further engagement.

In this preferred embodiment, the contacting surface 312 corresponds with the surface area of the long bone shaft 12 (not shown) at which the primary base 310 is intended to be fitted. Indeed, said contacting surface 312 embodies the surface topography that substantially matches the surface topography that is the characteristic features of said surface area of the long bone shaft 12, thereby providing the primary base 310 with an even more improved fitting and more precise positioning on the long bone shaft 12. Such contacting surface 312 is formed based on the patient-specific information which will be described fully further below.

Moreover, the fixator abutment 314 according to this preferred embodiment is adapted to have a shape corresponding to, and so as to engage, one predetermined fixator's end 130 (not shown).

The anatomy label 316 in this preferred embodiment provides further assistance to an operating surgeon in ascertaining the location on the long bone shaft 12 (not shown) at which the primary base 310 is to be attached. FIG. 4 exemplifies such anatomy label 316 to contain embossed inscriptions of a triangular arrowhead accompanied with "MED" so as to represent the direction of the patient's medial side. This way, the operating surgeon can conveniently check whether the primary base 310 is about to be attached to the correct position by verifying whether said inscriptions correspond to the actual patient's anatomical position. Indeed, the design of the anatomy label 316 may be selected based on the circumstances of operation, and the foregoing was merely incidental to an example case to which the preferred embodiment is applicable. For further example, the arrowhead may take other shapes and turn towards any other directions; and the "MED" inscription may be appended or replaced with "LAT" (for "lateral") "SUP" (for "superior"), "INF" ("inferior"), and so on, as the circumstances may require.

FIG. 4 shows yet further feature of a preferred embodiment in which the pre-drilling opening 322 allows a drilling means (not shown) of predetermined dimension to pass therethrough. In this embodiment, said drilling means is a drilling bit used for pre-drilling the long bone shaft 12 (not shown) before the fastener 115 (preferably a screw, not shown) is applied through the fastening location 110 (not shown) to the long bone shaft 12 to provide a permanent attachment between the fixator 100 (not shown) and the long bone shaft 12. Accordingly, said drilling means should be of the size and configurations that are appropriate for said pre-drilling procedure, and the size and configurations of said pre-drilling opening 322 should allow said drilling means to pass through the secondary base 320. Indeed, in this preferred embodiment, the pre-drilling opening 322, taking the form of a substantially circular countersunk hole, is wide enough to allow the drilling means to pass therethrough while narrow enough to effectively and substantially direct the drilling means to a the predetermined position on the long bone shaft 12, which further corresponds substantially to the fixator's 100 fastening location 110.

In this preferred embodiment, the drill-stopping element 324 takes the form of a rigid thin-walled cylindrical tube of a predetermined length, to be inserted through the pre-drilling opening 322 while still providing sufficient clearance for the drilling means to pass through both the drill-stopping element 324 and the pre-drilling opening 322, and then to reach the long bone shaft 12 (not shown), so as to enable an operating surgeon to perform the intended pre-drilling procedure. When being inserted such, the drill-stopping element 324 preferably is effectively held by, and protrudes at a predetermined length from, the secondary base 320, facing the drill abutment 324A generally away from the long bone shaft 12 to provide the drilling means with a stoppage, thereby allowing the drilling means to pass through the secondary base 320 up to a predetermined distance. In this preferred embodiment, the drill abutment 324A takes the form of a flange.

Further, in this preferred embodiment, the pilot opening 326 allows a pilot fastener 125 (preferably a wire, not shown) of predetermined dimension to pass therethrough. In this embodiment, the pilot opening 326 takes the form of a small hole that is substantially circular, wide enough to allow the pilot fastener 125 to pass therethrough while narrow enough to effectively and substantially align the pilot fastener 125 at a predetermined position, i.e., through the long bone shaft 12 and further through the fixator's 100 pilot fastening location 120.

Use of the Bone Fixation System in Operation. In this example, an operating surgeon applies a preferred embodiment as shown in FIGS. 1-4 and described above to a relevant case: a patient sustaining a fractured long bone, which is a clavicle, having a long bone shaft which sustains an effective fracture length defined by two effective fracture borders; and the long bone's relevant anatomical position is the superior side.

Figure 5:
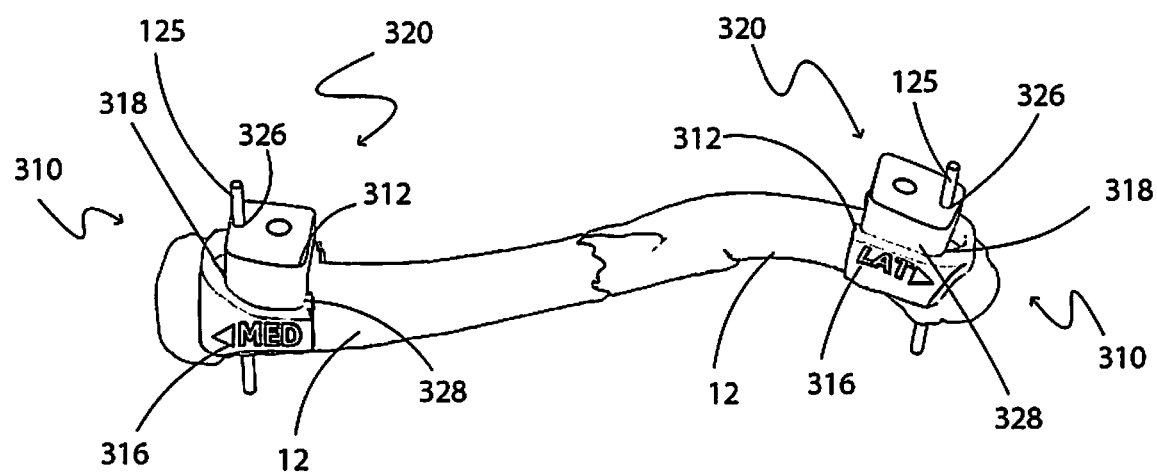
FIG. 5 shows a schematic for the role of a preferred embodiment of a drilling guide in the insertion of pilot fasteners during an example surgical operation (not to scale).

FIG. 5 illustrates the role of a preferred embodiment of a drilling guide in the insertion of pilot fasteners during the surgical operation according to this example. The surface area of the affected long bone shaft 12 is first fitted with the primary bases 310 and secondary bases 320. The primary bases' 310 open annular shape along with the contacting surfaces' 312 topographies as per the above description in connection with FIG. 4 allows a friction fitting conducive to the subsequent procedures. The anatomy labels 316 are placed in accordance with the intended alignments and anatomical positions (i.e. "MED" for medial and "LAT" for lateral sides). Then, the secondary bases 320 are mounted upon the primary bases 310 so that the pins 321 are inserted into the corresponding pinholes 311 and the secondary ridges 328 substantially contact the respective primary ridges 318. With said intended assembly at the shown correct positions, the drilling guides 300 provide means to allow and direct the pilot fasteners 125 to pass therethrough. In this case, the pilot fasteners 125, which in this example are wires, are drilled and inserted through the pilot openings 326 and then the long bone shaft 12, forming two pilot holes (not shown) on the long bone shaft 12 in the process.

Figure 6:
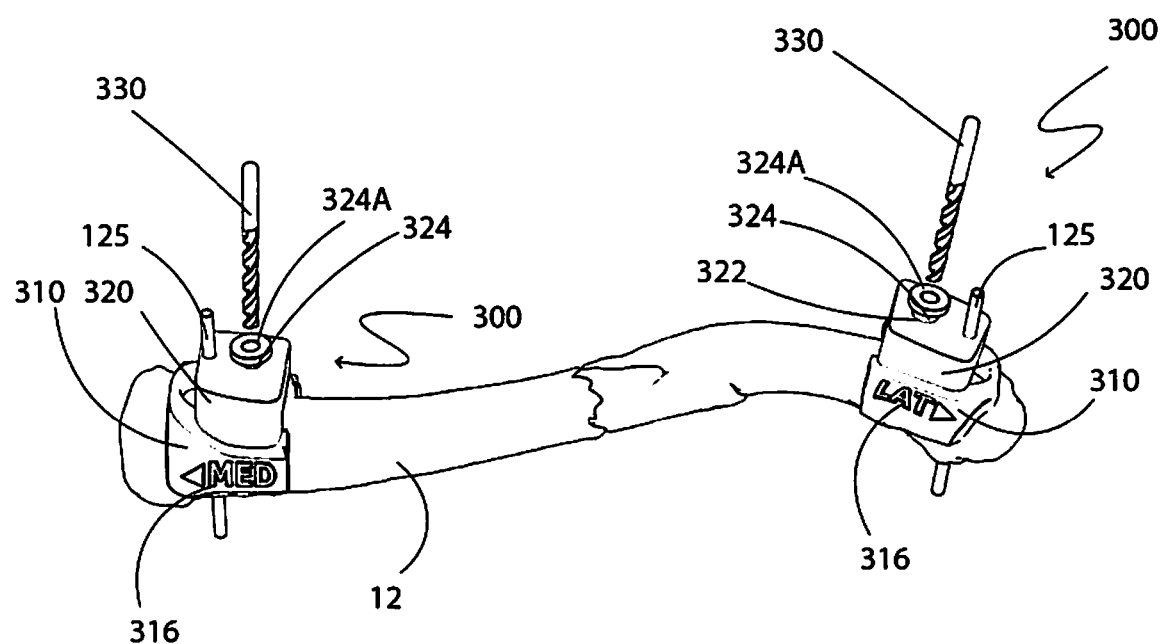
FIG. 6 shows a schematic for the role of a preferred embodiment of a drilling guide in the pre-drilling during an example surgical operation (not to scale).

FIG. 6 illustrates the role of a preferred embodiment of a drilling guide in the pre-drilling during the surgical operation according to this example. After the drilling guides 300, comprising the primary bases 310 and the secondary bases 320 have been fitted to the long bone shaft 12 and the pilot fasteners 125 inserted in accordance with FIG. 5, the drill-stopping elements 324 are inserted through the pre-drilling openings 322 to adjoin the surface of long bone shaft 12, so that the drill-stopping elements 324 are effectively held in place, and so that the drill abutments 324A protrude at a predetermined length from the secondary bases 320. The drilling means 330 is then inserted through each of the drill-stopping elements 324 to perform the pre-drilling procedure, before being effectively stopped by the drill abutment 324A at a predetermined depth.

Figure 7:
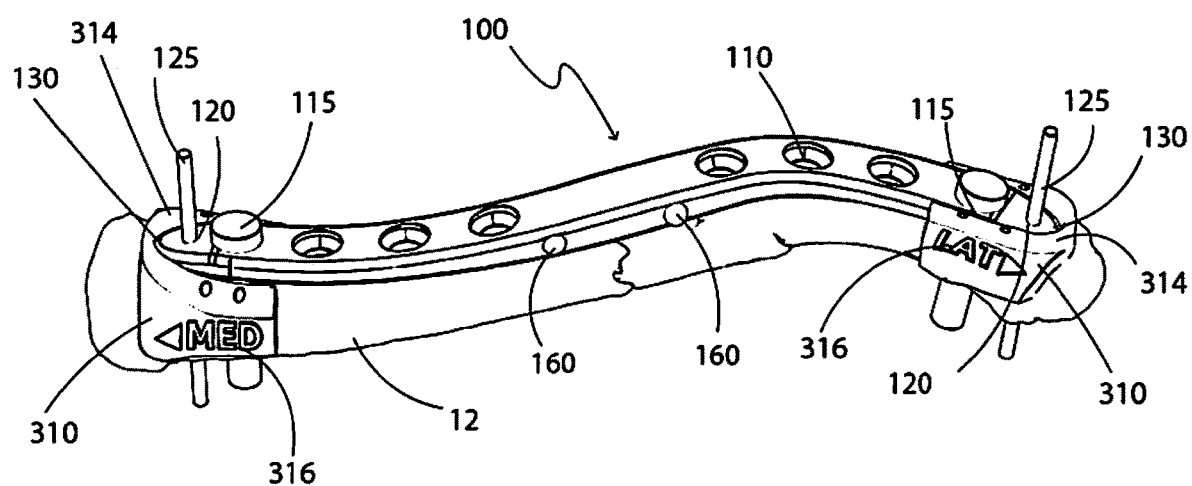
FIG. 7 shows a schematic for the role of preferred embodiments of a drilling guide and fixator in the drilling of fasteners during an example surgical operation (not to scale).

FIG. 7 illustrates the role of preferred embodiments of a drilling guide and fixator in the drilling of fasteners during the surgical operation according to this example. After the pre-drilling procedure as per FIG. 6 has been carried out, the secondary bases 320 (not shown) are removed along with the pilot fasteners 125 while the primary bases 310 remain fitted upon the same surface area of long bone shaft 12. Then, the preferred embodiment of fixator 100 is placed on the long bone shaft 12 in such a way that the fixator's ends 130 adjoin, and received by, their corresponding fixator abutments 314. In this position, the pilot holes on the long bone shaft (not shown) and the pilot fastening locations 120 substantially coincide, thereby jointly forming channels to be threaded by the pilot fasteners 125. Indeed, then the pilot fasteners 125 are re-inserted through such channels, thereby temporarily transfixing the long bone shaft 12 with the fixator 100 and the primary bases 310. In this example, such transfixions preferably take place about where the fastening locations 110 located farthest from the border markers 160 and closest to the fixator's ends 130. Through such fastening locations 110, the fasteners 115, which in this case are screws, are then drilled to their full length and through the long bone shaft 12, partially attaching the fixator 100 to the long bone shaft 12. The remaining fastening locations 110 will be filled with the remaining fasteners 115 in the later steps.

Figure 8A:
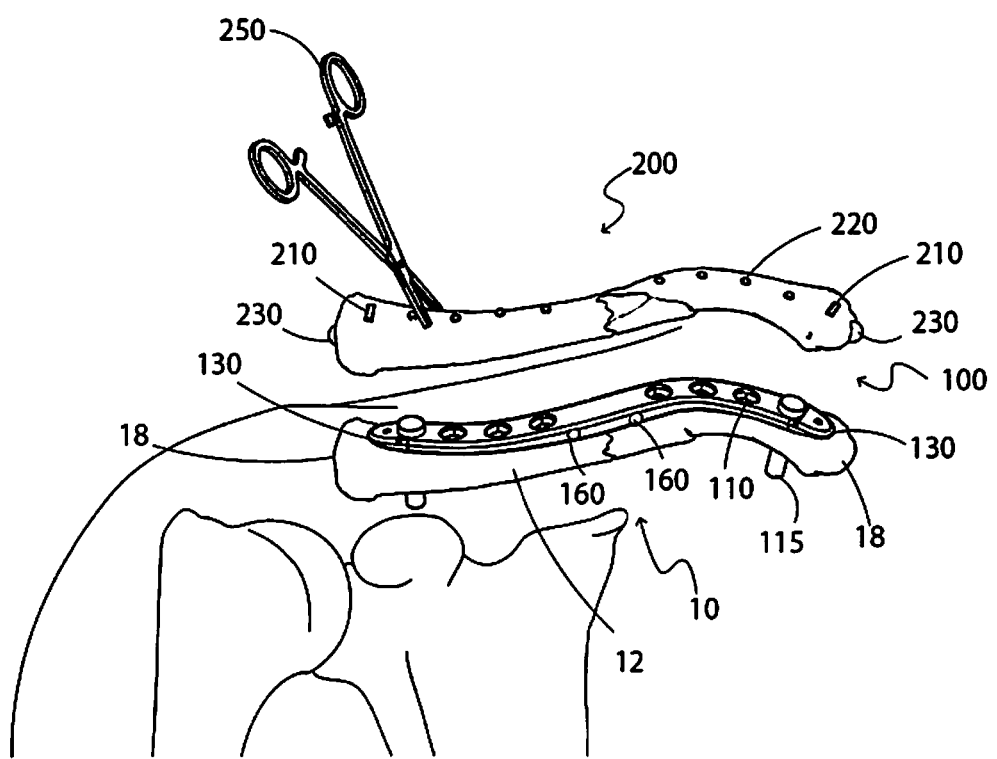
FIG. 8A shows a schematic for the role of a preferred embodiment of positioning guide in the drilling of other fasteners during an example surgical operation (not to scale).

FIG. 8A illustrates the role of a preferred embodiment of positioning guide in the drilling of other fasteners during the surgical operation according to this example. After the first two fasteners 115 have been drilled through the two fastening locations 110 located farthest from the border markers 160 and closest to the fixator's ends 130 as shown in FIG. 7, the pilot fasteners 125 (not shown) along with the primary bases 310 (not shown) are removed. Then, the positioning guide 200 is inserted into the patient's body, and held or otherwise manipulated by forceps 250 from outside the patient's body, thereby providing a means for checking the positions relevant to the bone fixation system with little invasiveness. According to FIG. 8A, the fixator-end markers 210 are aligned with the fixator's ends 130; the fastening markers 220 are aligned with the fastening locations 110; and the bone-end markers 230 are aligned with the long bone ends 18 as per the corrected alignment (i.e. restored to health) of the long bone 10. This way, the operating surgeon checks said relevant positions and able to make prompt adjustments to the bones while drilling the remaining fasteners 115 into the remaining fastening locations 110 and through the long bone shaft 12 until all the fastening locations 110 have been filled and the fixator 100 completely attached to the long bone shaft 12 as intended.

Figure 8B:
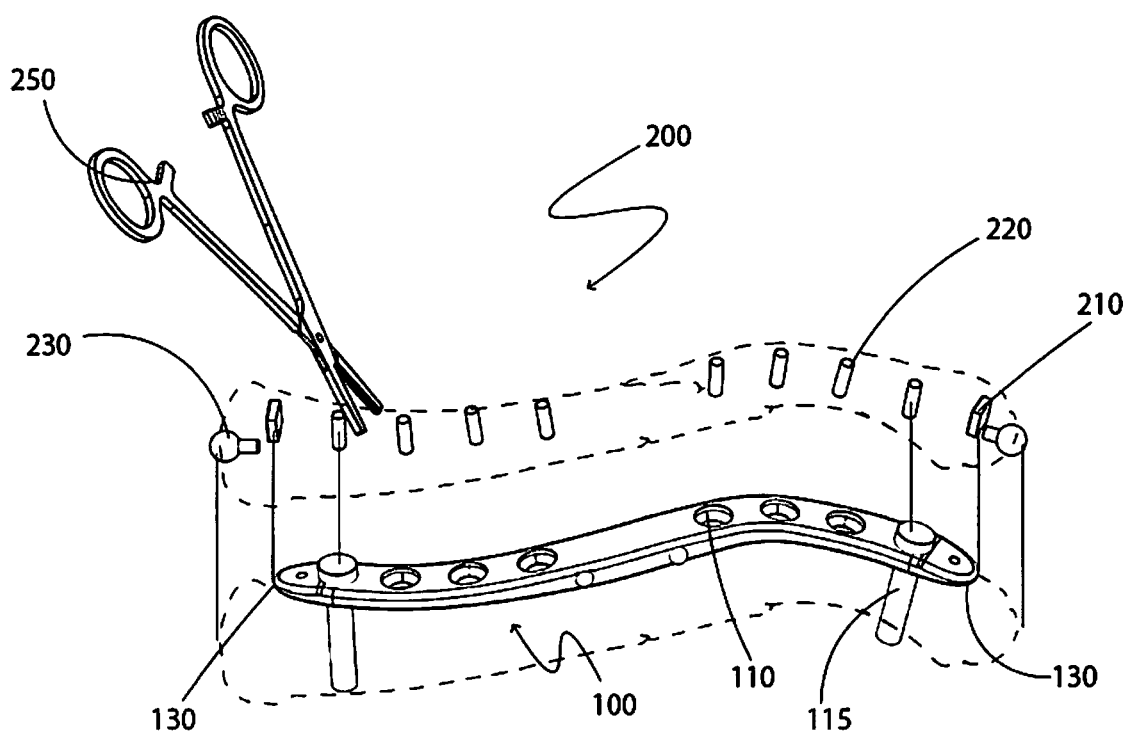
FIG. 8B shows a simplified view of the procedure per FIG. 8A that is visible to the operating surgeon through X-ray fluoroscopy (not to scale).

FIG. 8B illustrates a simplified view of the procedure per FIG. 8A that is visible to the operating surgeon through X-ray fluoroscopy. The solid lines represent the portions of positioning guide 200 which are radiopaque and thus seen through X-ray fluoroscopy, while the dash lines represent the portions of positioning guide 200 which are not radiopaque and thus obstructed by the patient's body and not seen through X-ray fluoroscopy. This view is enabled by the preferred embodiment, wherein all of the fixator-end markers 210, the fastening markers 220, and the bone-end markers 230 are radiopaque, and thus are observable through X-ray fluoroscopy. This way, the operating surgeon is assisted in holding and manipulating the positioning guide 200 by the forceps 250, checking the relevant positions, and make prompt adjustments as per the above description related to FIG. 8A, thereby reducing substantially the time and invasiveness required by the operation.

Figure 9A:
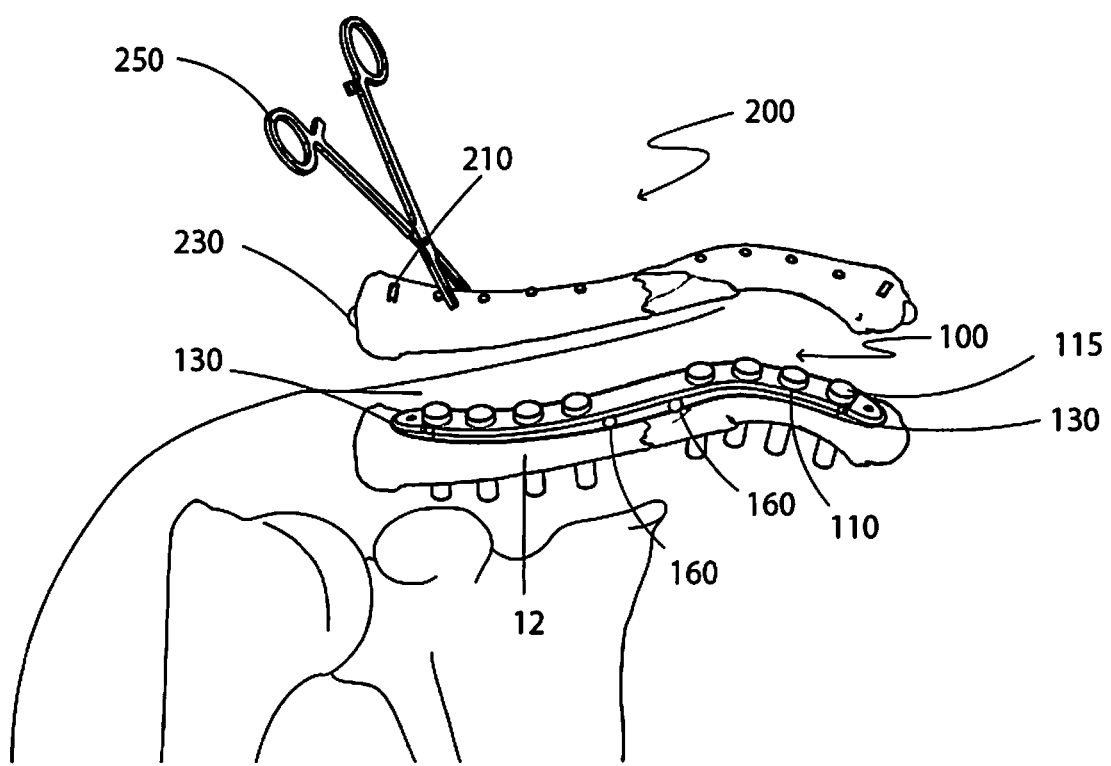
FIG. 9 shows a schematic for the role of a preferred embodiment of positioning guide in the final checking of relevant positions during an example surgical operation (not to scale).
FIG. 9B shows a simplified view of the procedure per FIG. 9A that is visible to the operating surgeon through X-ray fluoroscopy (not to scale).
Figure 9B:
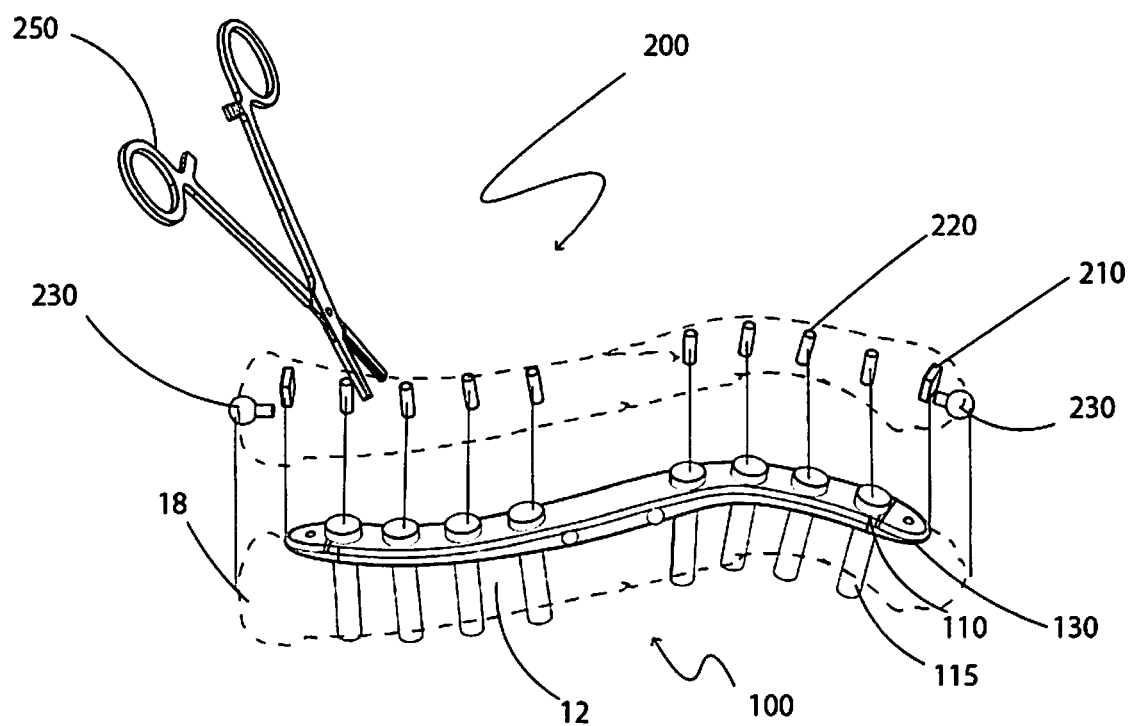

FIG. 9A illustrates the role of a preferred embodiment of positioning guide in the final checking of relevant positions during the surgical operation according to this example. Here, all the fastening locations 110 have been filled and the fixator 100 completely attached to the long bone shaft 12 as intended, the operating surgeon may use the positioning guide 200 to recheck that all the relevant positions are in accordance with the plan of surgical operation. FIG. 9B further illustrates a simplified view of the final recheck procedure per FIG. 9A that is visible to the operating surgeon through X-ray fluoroscopy. When all the positions relevant to the treatment have been confirmed to be in accordance with the plan of surgical operation, the wound is then closed and surgical operation completed.

Alternative Embodiments of the Bone Fixation System

It will be apparent in the following description that the concept of the present invention may be embodied in different adaptations as the circumstances of the operation may require. It should be noted, however, that the following description of alternative embodiments serves to exemplify such adaptations and thus by no means exhaustive, and that the following description of alternative embodiments will be focused on their deviations from the above-described preferred embodiment.

Figure 10:
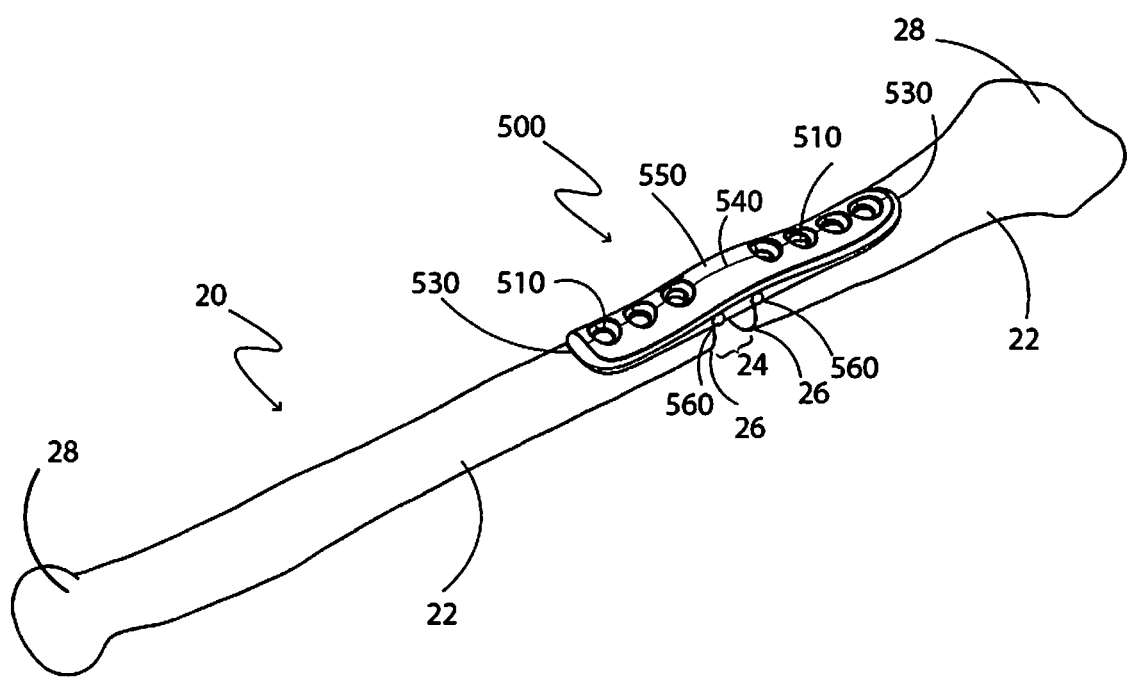
FIG. 10 shows a perspective view of a fixator according to an alternative embodiment (not to scale).

Fixator. FIG. 10 shows a perspective view of a fixator according to an alternative embodiment. In particular, a long bone 20 here is a radius having a long bone shaft 22 and two long bone ends 28, said long bone shaft 22 sustaining a fracture which causes an effective fracture length 24 defined by two effective fracture borders 26. Here, the long bone's 20 relevant anatomical position is the posterior side. Upon the surface of said posterior side at about close to one of the long bone's end 28, the long bone shaft 22 is intended to be mounted and attached with a fixator 500. In this alternative embodiment, said fixator 500 comprises seven fastening locations 510 to accommodate seven fasteners (not shown). Said seven fastening locations 510 are divided unevenly into two groups of four and three fastening locations, said two groups being situated substantially along the fixator's middle curvature 540 and oppositely across a high-load portion 550, which is a continuous portion of the fixator 500 that is free of the fastening location 510. Under the fixator 500 per this embodiment, there are two border markers 560 (not shown) intended to be sitting upon the surface of the long bone shaft 22 such that each of said border markers 560 coincides substantially with each of the effective fracture borders 26 when the fixator 500 has been attached to the long bone shaft 22. In this alternative embodiment, the fixator 500 has no pilot fastening location and is not designed to accommodate a pilot fastener.

Figure 11A:
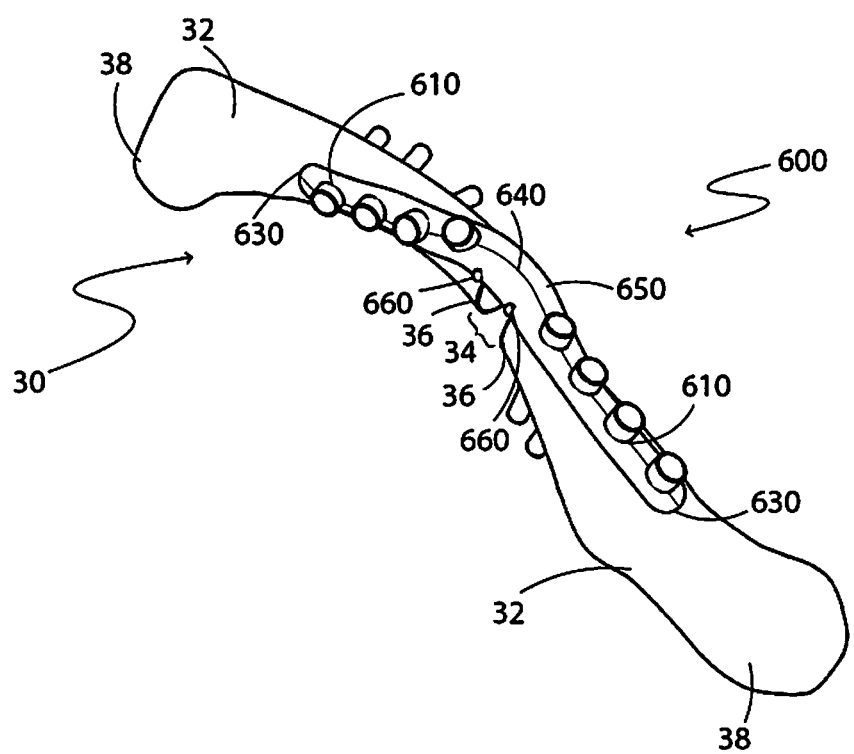
FIG. 11A shows a perspective view of a fixator according to yet another alternative embodiment (not to scale).

Furthermore, FIG. 11A shows a perspective view of a fixator according to yet another alternative embodiment. In particular, a long bone 30 here is a clavicle having a long bone shaft 32 and two long bone ends 38, said long bone shaft 32 sustaining a fracture which causes an effective fracture length 34 defined by two effective fracture borders 36. Here, the long bone's 30 relevant anatomical position are the antero-inferior sides (i.e. both the anterior and inferior sides). Upon the surfaces at about the middle of said antero-inferior sides, the long bone shaft 32 is intended to be mounted and attached with a fixator 600, which in this alternative embodiment takes the form of a spiraled bone plate (turning about a 90-degree sextant angle) so as to cover both the anterior and inferior sides. In this alternative embodiment, said fixator 600 comprises eight fastening locations 610 to accommodate eight fasteners (not shown). Said eight fastening locations 610 are divided evenly into two groups of four fastening locations, said two groups being situated substantially along the fixator's middle curvature 640 and oppositely across a high-load portion 650, which is a continuous portion of the fixator 600 that is free of the fastening location 610. Under the fixator 600 per this embodiment, there are two border markers 660 intended to be sitting upon the surface of the long bone shaft 32 such that each of said border markers 660 coincides substantially with each of the effective fracture borders 36 when the fixator 600 has been attached to the long bone shaft 32. In this alternative embodiment, the fixator 600 has no pilot fastening location and is not designed to accommodate a pilot fastener. In addition, the fixator according to this alternative embodiment comprises a width profile that is non-uniform and adapted so that the strength of the fixator is substantially at a predetermined safety factor. In this alternative embodiment, said width profile is preferably greater around the high-load portion 650, and more preferably said greater width profile extends to the zone around the fastening locations 610 that are adjacent to the high-load portion 650 as well. As shown in FIG. 11A, the increase of width preferably follows a substantially smooth profile.

Figure 11B:
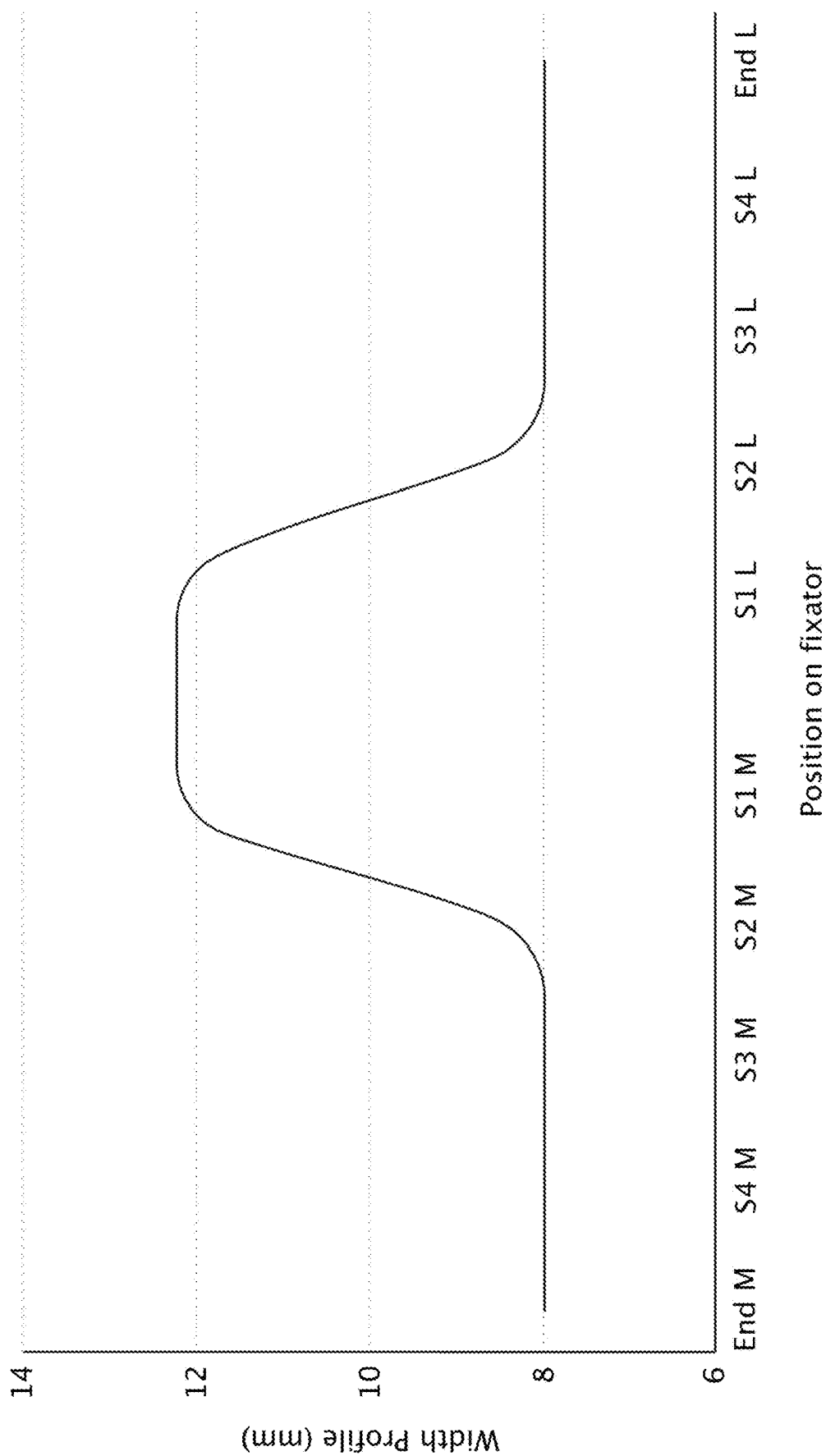
FIG. 11B shows a diagram representing the width profile when observed from a top view of a fixator which is part of a bone fixation system in accordance with an alternative embodiment per FIG. 11A (not to scale).

FIG. 11B shows a diagram representing the width profile when observed from a top view of a fixator which is part of a bone fixation system in accordance with an alternative embodiment shown earlier in FIG. 11A. "L" and "M" indicated along the X-axis in FIG. 11B represent the "lateral" and "medial" anatomical position of the long bone 30, respectively; and the numbers following said "L" and "M" represent the locations corresponding to the fastening locations 610 ordered by their proximity to the border markers 660, "1" being the closest and "4" being the farthest from the border markers 660 (i.e. closest to the fixator's end 630). Here, the width profile elevates from 8 mm to 12 mm. Said elevation follows the "bell-shaped" profile and covers from S2M to S2L, i.e. from the second fastening location on the medial side to the second fastening location on the lateral side). It is to be noted that the foregoing representations are merely incidental to the present example case of fracture for the purpose of illustrating this alternative embodiment, and thus by no means limiting the scope of present invention. In other cases of long bone fracture, the alphabetical representation could be adapted to stand for any one of "superior", "inferior", "anterior", "posterior", "proximal", "distal", etc. For the same reason, the count of numerical representation in other cases of fracture could be fewer or more than "1", "2", and "4" and does not need to be equal for both sides.

Figure 12:
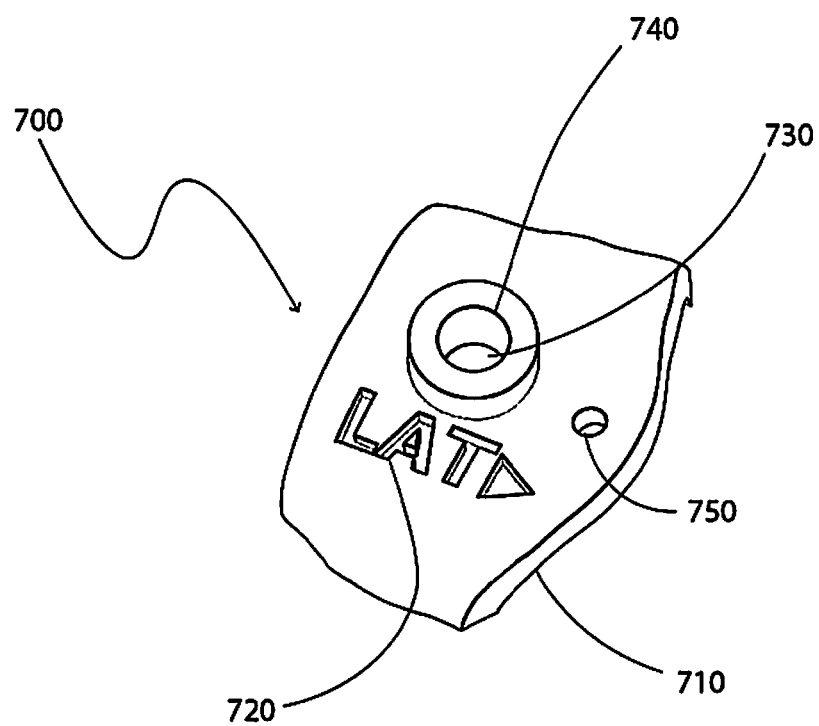
FIG. 12 shows a perspective view of a drilling guide according to an alternative embodiment (not to scale).

Drilling guide. FIG. 12 shows a perspective view of a drilling guide according to even further alternative embodiment. In this embodiment, a drilling guide 700 is not divided into two bases; instead, said drilling guide 700 takes the form of a single body of a bracket, to be temporarily fitted on the surface area of the long bone shaft (not shown). Said alternative drilling guide 700 comprises a contacting surface 710, an anatomy label 720, a pre-drilling opening 730, a drill-stopping element 740, and a pilot opening 750. In this alternative embodiment, the contacting surface 710 corresponds with the surface area of the long bone shaft (not shown) at which the drilling guide 700 is intended to be fitted. Indeed, said contacting surface 710 embodies the surface topography that substantially matches the surface topography that is the characteristic features of said surface area of the long bone shaft, thereby providing the drilling guide 700 with an even more improved fitting and more precise positioning on the long bone shaft. Such contacting surface 710 is formed based on the patient-specific information which will be described fully further below.

The anatomy label 720 in this alternative embodiment provides further assistance to an operating surgeon in ascertaining the location on the long bone shaft (not shown) at which the drilling guide 700 is to be attached. FIG. 12 exemplifies such anatomy label 720 to contain embossed inscriptions of a triangular arrowhead accompanied with "LAT" so as to represent the direction of the patient's lateral side. This way, the operating surgeon can conveniently check whether the drilling guide 700 is about to be attached to the correct position by verifying whether said inscriptions correspond to the actual patient's anatomical position.

In this alternative embodiment, the pre-drilling opening 730 is integral to or permanently attached with the drill-stopping element 740. Said drill-stopping element 740 takes the form of a flat ridge, said ridge being elevated at a predetermined length from, and covering substantially concentrically about, the edge of the pre-drilling opening 730. This configuration also provides sufficient clearance for a drilling means to pass through both the drill-stopping element 740 and the pre-drilling opening 730, and then to reach the long bone shaft (not shown), so as to enable an operating surgeon to perform the intended pre-drilling procedure, as well as providing the drilling means with a stoppage, thereby allowing the drilling means to pass through drilling guide 700 up to a predetermined distance.

Further, in this alternative embodiment, the pilot opening 750 allows a pilot fastener (preferably a wire, not shown) of predetermined dimension to pass therethrough.

The methods of designing and manufacturing the bone fixation system.

Figure 13:
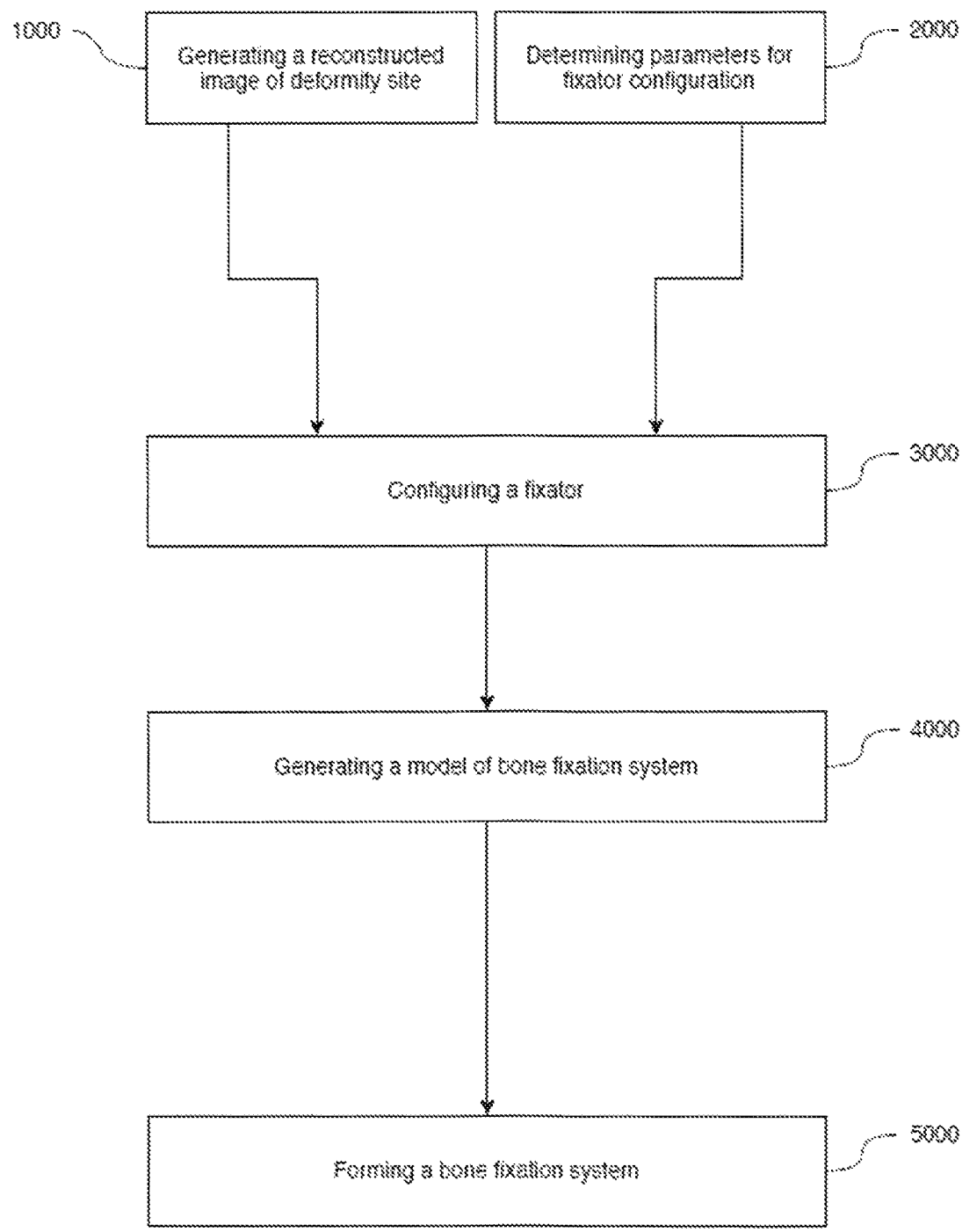
FIG. 13 shows a schematic flowchart of a method of manufacturing a bone fixation system for a fracture of a human's long bone shaft in accordance with a preferred embodiment.

FIG. 13 shows a schematic flowchart of a method of manufacturing a bone fixation system for a fracture of a human's long bone shaft in accordance with a preferred embodiment. Said method comprises: generating a reconstructed image of deformity site 1000; determining parameters for fixator configuration 2000; configuring a fixator 3000; generating a model of bone fixation system 4000; and forming a bone fixation system 5000. In a preferred embodiment, said reconstructed image of deformity site (i.e. image of a fractured bone which has been processed into a healthy condition) is a digitized model, and generating the reconstructed image of deformity site 1000 is computer-aided or computer-automated; said determining parameters for fixator configuration 2000 is computer-aided, or computer-automated; said configuring a fixator 3000 is computer-aided or computer-automated; said model of bone fixation system is a digitized model and generating a model of said bone fixation system 4000 is computer-aided or computer-automated; and said forming a bone fixation system 5000 is computer-aided or computer-automated, in particular an additive manufacturing process. Moreover, said preferred embodiment provides that the steps of generating a reconstructed image of deformity site 1000 and determining parameters for fixator configuration 2000 may be carried out separately and before configuring the fixator 3000, as well as provides a feedback loop between generating a model bone fixation system 4000 and configuring the fixator 3000. It is within the inventor's appreciation that any part of the foregoing steps may be carried out via a computer network.

It should be noted that the concept of the present invention recognizes that a "bone fixation system" includes a fixator and a surgical assisting kit (i.e. a positioning guide and/or a drilling guide); thus a method of manufacturing a bone fixation system in accordance with the invention may be adapted to generate any part of said bone fixation system in any order. More particularly, where said method is adapted to generate both the fixator and the surgical assisting kit, the abovementioned step of generating a model of bone fixation system 3000 may be adapted so that the model of fixator is generated first and then the model of surgical assisting kit is generated later to correspond substantially with the model of fixator, or vice versa. Notwithstanding, the preferred embodiments to be descried in the following paragraphs are those adapted so that the model of fixator is generated first and then the model of surgical assisting kit is generated later. Such design choice shall be particularly reflected in the following description relating to the steps of configuring fixator 3000 and generating the model of bone fixation system 4000, wherein the "fixator" is specified in the earlier working steps and the "surgical assisting kit" is specified in the later working steps. A skilled person would appreciate that said manner of specification is made for the purpose of illustration, which is incidental to the preferred embodiments and does not limit the scope of the present invention to any order by which parts of the model of bone fixation system are generated.

Figure 14:
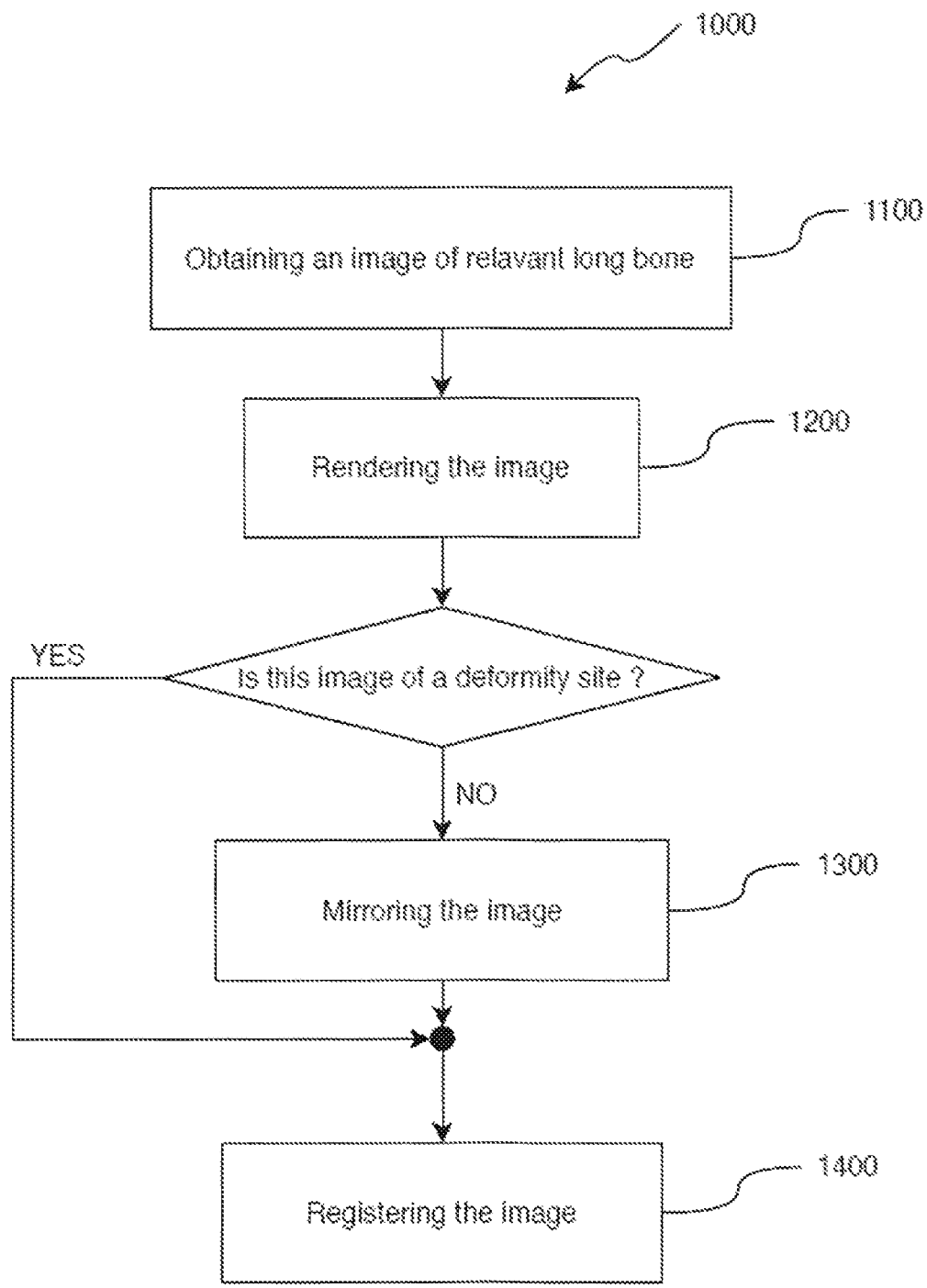
FIG. 14 shows a schematic flowchart of generating a reconstructed image of deformity site in accordance with a preferred embodiment.

FIG. 14 shows a schematic flowchart of generating a reconstructed image of deformity site 1000 in accordance with a preferred embodiment. Said step of generating a reconstructed image of deformity site 1000 further comprises the steps of obtaining an image of relevant long bone 1100; rendering the image 1200; mirroring the image 1300; and registering the image 1400.

In this preferred embodiment, said step of obtaining an image of relevant long bone 1100 is carried out by a computerized tomography (CT) scan to obtain the three-dimensional digitized images. Here, there are two relevant long bones: the long bone of which shaft is fractured (i.e. the "deformity site") and the long bone corresponding to the deformity site. For instance, if the patient's left clavicle shaft is fractured, the relevant long bones are both the left clavicle which is the deformity site, and the right clavicle shaft which is not a deformity site. In both cases, the images of said relevant long bones are rendered in the step of rendering the image 1200 to produce photo-realistic images of the relevant long bones. Next, only the rendered images which are not of the deformity site are subject to the step of mirroring the image 1300 before the step of registering the image 1400, while the rendered images which are of the deformity site are directly subject to the step of registering the image 1400 without the need to be mirrored. The step of registering the image 1400 performs the work of aligning the images of the deformity site (not mirrored by 1300) with those not of the deformity site (mirrored by 1300), thereby generating a reconstructed image of deformity site suitable for the next step of configuring a fixator 3000.

Figure 15:
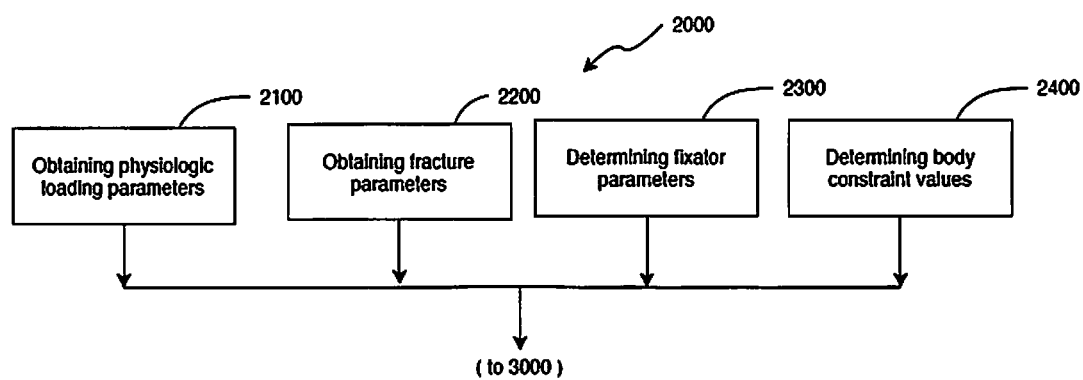
FIG. 15 shows a schematic flowchart of determining parameters for fixator configuration in accordance with a preferred embodiment.

FIG. 15 shows a schematic flowchart of determining parameters for fixator configuration 2000 in accordance with a preferred embodiment. Said step of determining parameters for fixator configuration 2000 further comprises the steps: obtaining physiologic loading parameters 2100; obtaining fracture parameters 2200; determining fixator parameters 2300; and determining body constraint values 2400. The foregoing parameters are preferably obtained by diagnosing the patient under the physician's supervision. According to this embodiment, at least one of the fixator dimension values (which is part of the fixator parameters) is determined to be a "varied" value, subject to the design formula which will be later determined in configuring a fixator 3000, below.

Figure 16:
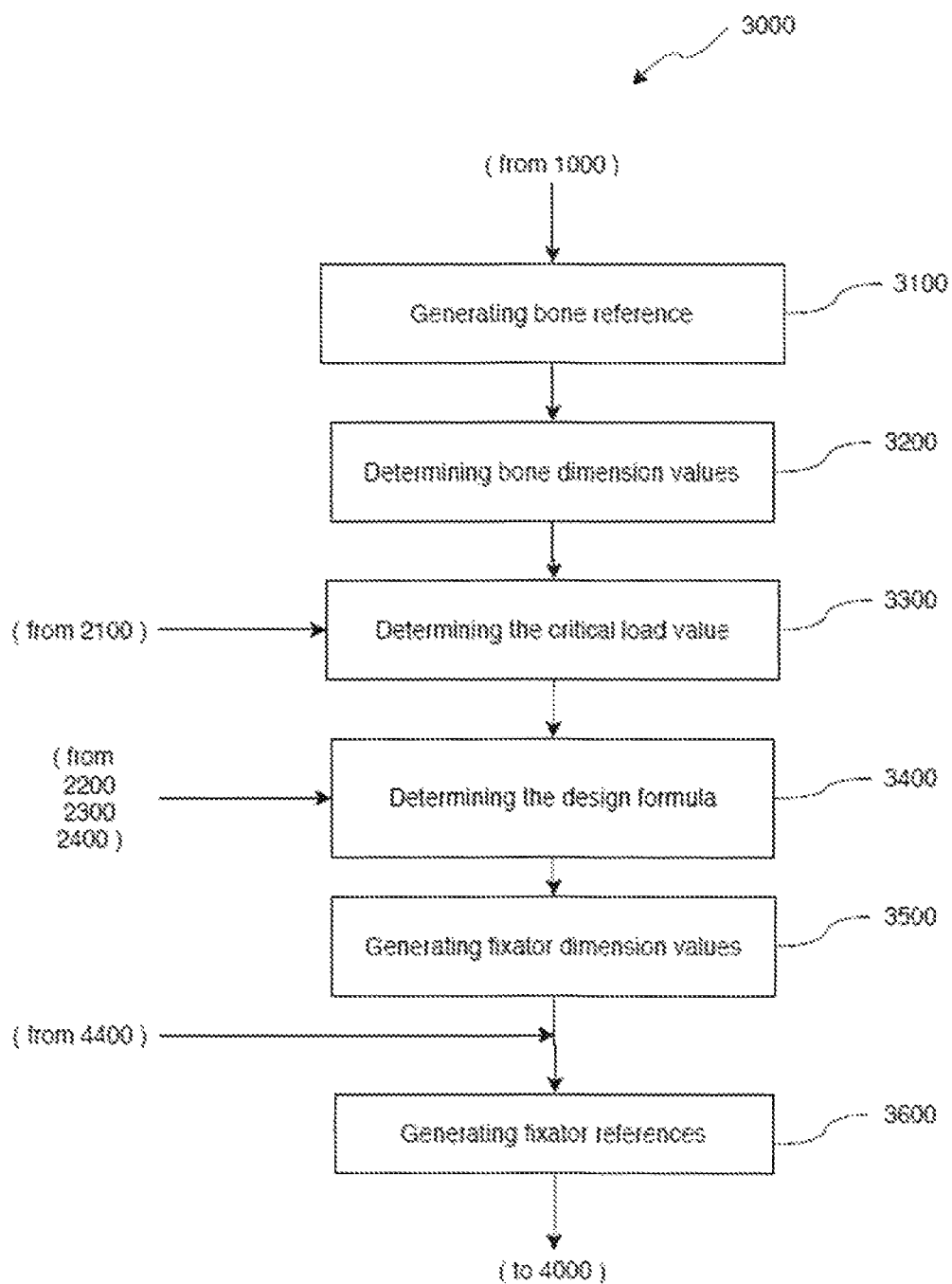
FIG. 16 shows a schematic flowchart of configuring a fixator in accordance with a preferred embodiment.

FIG. 16 shows a schematic flowchart of configuring a fixator 3000 in accordance with a preferred embodiment. Said step of configuring a fixator 3000 further comprises the steps of generating bone references 3100; determining bone dimension values 3200; determining the critical load value 3300; determining the design formula 3400; generating fixator dimension values 3500; and generating fixator references 3600. Said preferred embodiment also receives inputs obtained or determined from generating a reconstructed image of deformity site 1000 and determining parameters for fixator configuration 2000 above, and feedback loop from the step of reviewing the CAD model of fixator 4400 (to be described below) to further adjust the fixator dimension values.

In a preferred embodiment, the reconstructed image of deformity site generated by the steps in accordance with FIG. 14 above is processed in the step of generating bone references 3100. Then, the bone references become the basis of determining bone dimension values 3200. Said bone dimension values, along with the fixator dimension value and physiologic loading parameter received from the steps in accordance with 2000 above, then become the basis of calculating the critical load value 3300. The rest of parameters and/or values, received from steps in accordance with determining parameters for fixator configuration 2000, then become the basis of determining the design formula 3400. In this preferred embodiment, the critical load value has at least two further functions: to provide a means of further selecting the design formula if more than one design formulas have been determined by step 3400 (to be discussed in the below example); and to be inputted into the design formula as an independent variable in order to generate the final value of a fixator dimension value (step 3500 in FIG. 16) that has been previously determined to be a "varied" value in the steps in accordance with determining parameters for fixator configuration 2000, above. Next, the bone references generated by 3100 above, along with the fixator parameters determined by 2300 above, become the basis of determining the fixator references 3600.

The design formula determined by step 3400 is an expression of relationship whereby said "varied" fixator dimension value (i.e. dependent variable) is a function of the critical load value (i.e. independent variable). In this preferred embodiment, the design formula is a linear function y=mx+c, wherein y is the "varied" fixator dimension value; x is the critical load value; and m and c which are respectively slope and constant depends on the fracture parameter, fixator parameter, and body constraint value. In this preferred embodiment, each of the design formula is further constrained within its respective domain of x and range of y. In this preferred embodiment, the values of m and c are predetermined by carrying out numerical simulations based on the finite element analysis (FEA) technique to find the "varied" fixator dimension value y which effectively sustains the critical load value x under various combinations of fracture parameter, fixator parameter, and body constraint value. The sets of m and c values corresponding to said combinations are then stored in a formula library which is indexed according to the fracture parameter, fixator parameter, and body constraint value. In this preferred embodiment, the formula library takes the form of a digital database which is searchable by the fracture parameter, fixator parameter, or body constraint value. In this preferred embodiment, said digital database is pre-loaded on a computer-readable storage medium. Indeed, said medium is preferably a non-volatile memory and may be part of a computer device, computer system, or computer network or like which may be adapted so as to be accessible on-site or remotely, or both.

Figure 17:
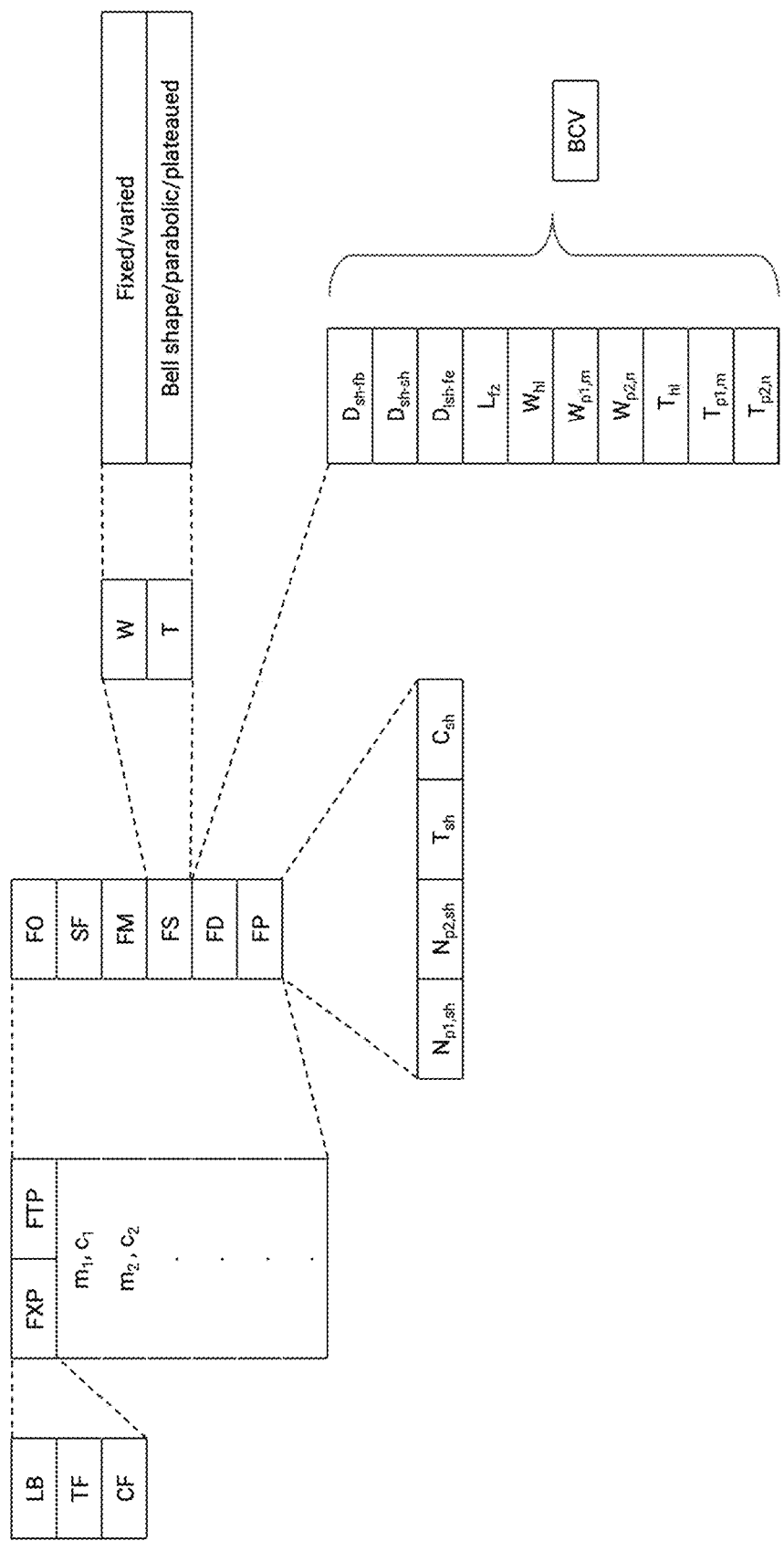
FIG. 17 shows a schematic structure of a formula library in accordance with a preferred embodiment.

Particularly, the formula library in this preferred embodiment takes the form of a digital database which may be described as a digitized lookup table. FIG. 17 shows a schematic structure of said formula library in accordance with a preferred embodiment. Here, the formula library 3400 is searchable by any combination of the fracture parameter (FXP), the fixator parameter (FTP), and the body constraint value (BCV).

Further, the fracture parameter (FXP) comprises: type of long bone (LB), type of fracture (TF), and condition of fracture (CF).

Further, the fixator parameter (FTP) comprises: fixator's orientation (FO), safety factor (SF), fixator's material (FM), fixator shape condition, (FS) fixator dimension value (FD), and fastening parameter (FP). More particularly, the fixator shape condition (FS) comprises a combination of the fixator's features of "width" (W) or "thickness" (T), which may be "fixed" or "varied", and if varied may be varied along the "bell-shaped", "parabolic", or "plateaued" profile. The fixator dimension value (FD) comprises the distances between screw hole and effective fracture border ($D_{sh\text{-}fb}$), between screw holes ($D_{sh\text{-}sh}$) and between the last screw hole and the fixator end ($D_{ish-fe}$); the length of fastening zone ($L_{fz}$); the fixator's widths at the high-load portion ($W_{hl}$), at the $m^{th}$ screw hole on the first anatomical position ($W_{p1,\,m}$), and at the $n^{th}$ screw hole on the second anatomical position ($W_{p2,\,n}$); and the fixator's thickness at the high-load portion ($T_{hl}$), at the $m^{th}$ screw hole on the first anatomical position ($T_{p1,\,m}$), and at the $n^{th}$ screw hole on the second anatomical position ($T_{p2,\,n}$). At least one of the foregoing values in the category of fixator dimension value (FD) has been determined as "varied" in the step according to the above FIG. 15. In this preferred embodiment, said "varied" fixator dimension value (FD) is the fixator's thickness at the high-load portion ($T_{h1}$). Some, instead of all, of other FDs are preferably determined to be fixed values to narrow down the search results to a group of design formulas which are subject to further refinement so as to find the design formula (i.e. the slope m and constant c of the linear function) which maximizes the normalized difference between (a) the body constraint value and (b) the fixator dimension value (see below example). For avoidance of doubt, the "first" and "second" anatomical positions refer to said positions (e.g. lateral, medial, superior, inferior, etc.) of the affected long bone shaft upon which each side of the fixator (i.e. divided by the high-load portion) is intended to be attached. It follows that the "$m^{th}$" and "$n^{th}$" screw hole refer to the ordinal number of the screw hole on that side. While such $m^{th}$ or $n^{th}$ number may have any total number or be ordered in any manner on each side, for the purpose of this preferred embodiment, the total number of screw holes is three on both sides (i.e. m, n=1, 2, or 3) and the order is based on the distance from the nearest effective fracture border (i.e. 1 being the screw hole closest to the effective fracture border, and 3 being the farthest). In other embodiments, the widths and thicknesses at any defined location on the fixator may be included into the scope of fixator dimension value (FD). Further, the fastening parameter (FP) comprises: the minimum number of screw holes on the first and second anatomical position ($N_{p1,sh}$ and $N_{p2,sh}$), the type of screw holes ($T_{sh}$), and the constellation of screw holes ($C_{sh}$).

In this preferred embodiment the fixator dimension values (FD) which is constrained by the body constraint values (BCV) is the length of fastening zone ($L_{fz}$).

Figure 18:
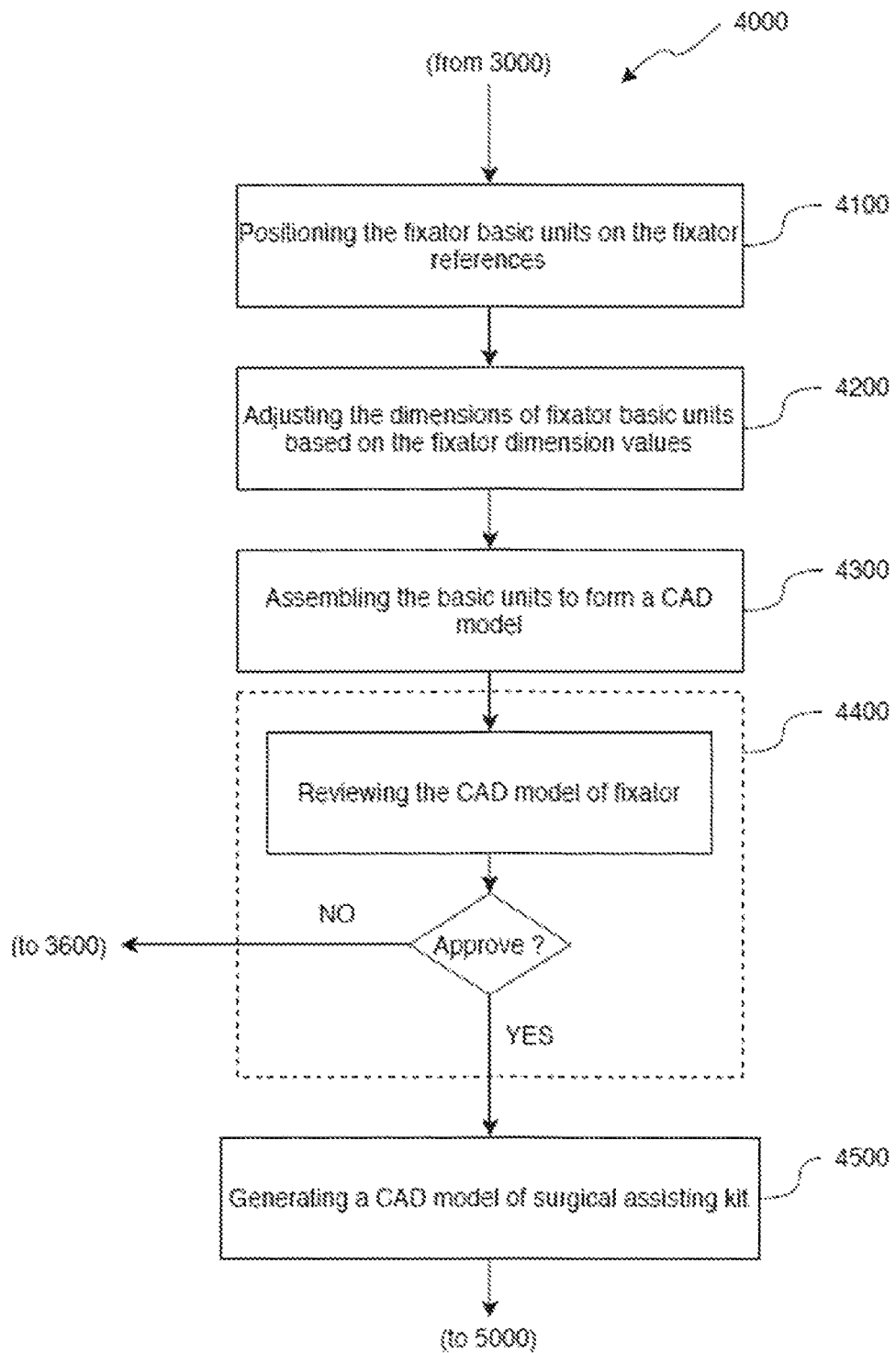
FIG. 18 shows a schematic flowchart of generating a model of bone fixation system in accordance with a preferred embodiment.

FIG. 18 shows a schematic flowchart of generating a model of bone fixation system 4000 in accordance with a preferred embodiment. Said step of generating the model of bone fixation system 4000 further comprises the steps of positioning the fixator basic units on the fixator references 4100; modifying the dimensions of fixator basic units based on the fixator dimension values 4200; assembling the basic units to form a CAD model 4300; reviewing the CAD model of fixator 4400; and generating a CAD model of surgical assisting kit 4500. Further, said preferred embodiment provides a feedback loop to update the fixator's dimension values before reiterating the step of generating the fixator references 3600 (described above).

In particular, reviewing the CAD model of fixator 4400 is carried out manually by a surgeon who may either approve said CAD model, or instruct further adjustments to any of the fixator dimension values. In this preferred embodiment, said adjustment to the fixator dimension value causes the step of generating fixator references 3600 (described above) to be reiterated, thereby updating the fixator references for a subsequent reiteration of the step of positioning the fixator basic units on the fixator references 4100, and then modifying the dimensions of fixator basic units based on the fixator dimension values 4200 and assembling the basic units to form a CAD model 4300, resulting in an updated CAD model of fixator for another review in accordance with 4400. If the CAD model of fixator is approved, the next step is generating a CAD model of surgical assisting kit.

As previously mentioned, said surgical assisting kit may comprise either or both of the positioning guide and the drilling guide. Said positioning guide preferably has at least one fixator-end marker adapted to coincide substantially with one end of the fixator; a plurality of fastening markers adapted to coincide substantially with the fastening locations; and at least one bone-end marker adapted to coincide substantially with a predetermined position of the long bone end when the fixator has been attached to the long bone shaft. Further, said drilling guide preferably has screw holes for fastening locations and is adapted to be temporarily fitted on a surface area of the long bone shaft, has an opening so as to allow a drilling means of predetermined dimension to pass therethrough, has a contacting surface which substantially corresponds with the surface area of the long bone shaft, and is adapted to engage one end of the fixator. The CAD model of fixator approved accordingly and/or the CAD model of surgical assisting kit generated accordingly, will be subsequently used in the step of forming a bone fixation system 5000.

In a preferred embodiment, the step of forming a bone fixation system 5000 may be selected and adapted to suit the part of bone fixation system being formed. In particular, a fixator requires precise mechanical load-bearing property and so is preferably formed by an additive manufacturing apparatus in the type of selective laser manufacturing (SLM) or like, while a surgical assisting kit may be, and is preferably, formed by a desktop additive manufacturing apparatus in the type of fused filament fabrication (FFF) or like. Owing to said mechanical property requirement, it is as well preferred that a fixator is subject to annealing and/or surface treatment or like after the additive manufacturing process. Likewise, the material requirements of different parts of bone fixation system are different Example of the method of designing and manufacturing the bone fixation system.

The reconstructed image of deformity site is generated in accordance with the above description of FIG. 14.

Parameters for fixator configuration 2000 are determined in accordance with the above description of FIG. 15. Particularly from the patient sustaining a fracture in the long bone shaft, the following information is obtained:

Fracture parameter (FXP):
  Type of long bone (LB) is clavicle.
  Type of fracture (TF) is comminuted.
  Condition of fracture (CF) is new.
Physiologic loading parameter:
  Body parameters: age, weight, BMI, and biological race and sex.
  Activity parameters: occupation and sport activity.

Further, the following information is selected by the physician's recommendation and/or by a computer device's aid:

Fixator parameter (FTP):
  Fixator's orientation (FO) is superior.
  Safety factor (SF) is 2.
  Fixation material (FM) is titanium.
  Fixator shape conditions (FS) are:
    Width (W): fixed
    Thickness (T): varied, bell-shaped profile.
  Fastening parameters (FD) are:
    Minimum number of screw holes on the first anatomical position ($N_{p1,\,sh}$) is 3.

Minimum number of screw holes on the second anatomical position ($N_{p2, sh}$) is 3.

Type of screw holes ($T_{sh}$) is non-threaded.

Constellation of screw holes ($C_{sh}$) is in-line.

Fixator dimension values (FD):

Distance between screw hole and effective fracture border ($D_{sh\text{-}fb}$) is 10.0 mm.

Distance between screw holes ($D_{sh\text{-}sh}$) is 15.0 mm.

Distance between the last screw hole and the fixator end ($D_{ish\text{-}fe}$) is 10.0 mm.

Length of fastening zone ($L_{fz}$) is constrained at 50.0 mm by the body constraint value (BCV).

Fixator's width at the high-load portion ($W_{hl}$) is 10.0 mm.

Fixator's widths at the $1^{st}$, $2^{nd}$, and $3^{rd}$ screw holes on the first and second anatomical positions (in this case, lateral (L) and medial (M)) ($W_{L,1}$, $W_{L,2}$, $W_{L,3}$, $W_{M,1}$, $W_{M,2}$, $W_{M,3}$,) are not fixed for this searches.

Fixator's thickness at the high-load portion ($T_{hl}$) is within 2.5-5.0 mm (i.e. a "varied" value—the final value is subject to the design formula).

Fixator's thicknesses at the $1^{st}$, $2^{nd}$ and $3^{rd}$ screw holes on the first and second anatomical positions (in this case, lateral (L) and medial (M)) ($T_{L,1}$, $T_{L,2}$, $T_{L,3}$, $T_{M,1}$, $T_{M,2}$, $T_{M,3}$,) are not fixed for this searches.

Next, a fixator is configured in accordance with the above description of FIG. 16. Particularly, a number of rectangular planes are visually generated to simplify the shape, and thus to facilitate the determination of the following bone dimension values: the affected clavicle's length of flat surface along the middle curvature, width profile, effective fracture length, and distances from the affected clavicle's ends to the effective fracture borders.

Said bone dimension values along with the previously obtained physiologic loading parameters are then used to calculate a critical load value, which in this case is a bending moment vector. In this example, the bending moment vector is based further on the pulling force in the downwards direction exerted at the patient's shoulder on the lateral side of the clavicle, said pulling force being caused by the weight of the patient's arm. Said pulling force would cause the bending moment against the fixator attached over the effective fracture length of the fractured clavicle. In this example, said pulling force is 100 N, an average value readily available in Teng-Le Huang et al., 2016, which is incorporated into this specification by reference. Further in this example, the multiplier of such pulling force is determined based on the patient's physiologic loading parameters (comprising body parameters and activity parameters): a patient who is an English male having weight and height within the population's average ranges would produce the multiplier=1.0 based on his body parameters; and if said patient is not expected to perform a physically laborious work/activity involving his respective arm within six months following the surgery, then the multiplier=1.0 based on his activity parameter. Said pulling force, after being modified by the physiologic loading parameters, is then used to determine the bending moment (i.e. the critical load value in this example) by timing the modified pulling force with some of the fixator dimension values and some of the bone dimension values, which in this example is the distance between the first fastening location from the effective fracture border on the medial side (i.e. one of the fixator dimension values) and the clavicle's end at the lateral side (i.e. one of the bone dimension values). In this example, such distance is 60 mm, making the bending moment 6 N-m. This bending moment is considered the critical load value, and thus subsequently used as this example's independent variable of the design formula.

Subsequently, the design formula is determined by searching in the formula library according to the above description of FIG. 17 by inputting the previously obtained information under the categories of fracture parameter (FXP), and fixator dimension values (FD) which are defined by the body constraint values (BCV), as well as the critical load value. The critical load value is used to refine or verify the search results by substituting said critical load value into the linear function having the set of slope m and constant c found from the searches in the formula library, in order to determine whether the design formula would maximize the normalized difference between the body constraint value (i.e. maximum limit of the fixator dimension value) and the fixator dimension value. According to this example, said "normalized difference", is calculated by the following equation:

$$n = a * \frac{T_{hl}}{T_{hl,max}} + b * \frac{W_{hl}}{W_{hl,max}} + c * \frac{L_{fz}}{L_{fz,max}},$$

wherein a, b, and c are weight ratios which depend on the bone parameters and fixator parameters and the sum of a+b+c is 1. A plurality of sets of weight ratios are predetermined and indexed, and preferably stored electronically or pre-loaded on a computer-readable medium, based on the scenario of long bone fracture. In this example case where the affected long bone is clavicle and the fixator's orientation is superior, the thickness and length, respectively, are of greater concern, while the width is not so much relevant. This is because the patient's skin on the superior side is relatively thin and thus a fixator having excessive thickness might injure the patient. Similarly, the fixator's excessive length would pose a risk to damage the neighboring tissues or blood vessels but when compare with thickness, such problem is less sensitive to each unit of increasing length. Therefore, in this example case, the weight ratios are: a=0.5, b=0.2, and c=0.3. Further, in this example, the width of high-load portion is a fixed value without constraint, and thus $$\frac{W_{hl}}{W_{hl,max}} = 1.$$

It is apparent from me above equation that the "normalized difference" is maximized when n is minimized.

From the design formula searched and verified thus, the maximum thickness of high-load portion is determined. Accordingly, all the bone references and the fixator parameters needed to generate the fixator references have been provided. In this example, the fixator references generated thus are: cross-section planes (i.e. at the fixator ends, at the screw holes' axes, and at the border markers); the screw holes' axes, the screw holes' countersink plane, and the fixator's middle curvature along the clavicle's flat surface corresponding to the fixator's orientation.

Figure 19:
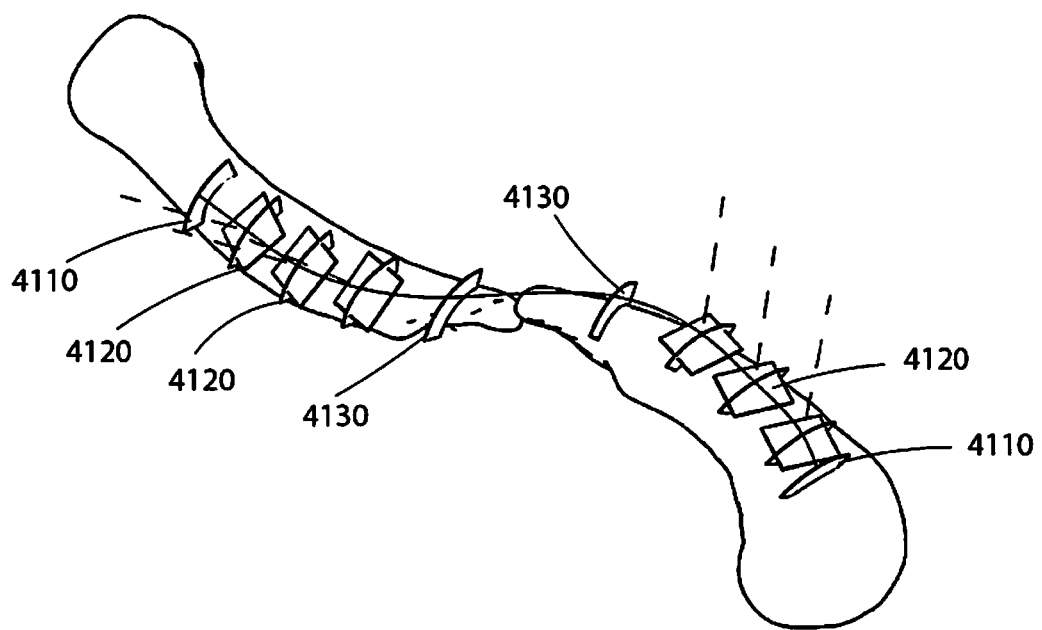
FIG. 19 shows a schematic of the application of fixator references in generating a model of bone fixation system in accordance with a preferred embodiment (not to scale).

The process then proceeds to the generation of the model of bone fixation system in accordance with the above description of FIG. 18. Specifically, application of the fixator references in generating the model of bone fixation system is shown further in FIG. 19. In FIG. 19, the fixator references are placed at their intended positions. Specifically, the fixator references of cross-section planes are placed at the positions of fixator ends 4110, screw holes axes 4120, and the border markers 4130), thereby setting the locations to which the corresponding fixator basic units (e.g. cylindrical screw holes) are applied. After said application of fixator basic units, the fixator dimension values are applied to modify the dimensions from the default values of the corresponding fixator basic units (e.g. the width and thickness of the fixator at the high-load portion and elsewhere, the distance between screw holes, etc.). These modified basic units are then assembled by visually connecting the cross-section planes along the fixator's middle curvature and creating the spaces at the locations of screw holes, etc., to form the CAD model, which is then reviewed by the surgeon. The surgeon may further customize the fixator, which in this example is done by way of adding the fixator's length towards the fixator end (i.e. keeping the distance between border markers, between the border marker and the screw, and between the screws, constant) and/or adding more screw holes towards the fixator end. In such case, the fixator references are then re-generated and new fixator CAD model formed for another surgeon's review. After approval of fixator CAD model, the surgical assisting kit comprising one positioning guide and two drilling guides are formed. Said positioning guide is formed so as to have fixator-end markers and fastening markers which correspond with the respective positions of the fixator; and the bone-end marker which corresponds with the above-discussed reconstructed image of deformity site and/or bone references generated from such reconstructed image. Moreover, said drilling guide is formed so as to have an opening corresponding with the fixator's respective screw hole so as to allow a drilling means to pass therethrough; and the contacting surface which substantially corresponds with the surface area of the reconstructed image of deformity site at which the drilling guide is intended to be fitted temporarily.

The above CAD models of the fixator along with the surgical assisting kit are then used in the forming of the bone fixation system, as described above in connection with the step 5000.

The invention claimed is:

1. A method of configuring a bone fixation system for a fracture of a human's long bone shaft, said method comprising
    determining a fixator reference and a fixator dimension value,
    wherein determining said fixator reference is based on at least: a bone reference, a fixator parameter, and said fixator dimension value;
    wherein said fixator dimension value comprises a function of a critical load value in accordance with a design formula, said design formula being based on a fracture parameter, a fixator parameter, and a body constraint value; and
    wherein the design formula is determined by searching a formula library wherein a plurality of design formulas are searchable by the fracture parameter, the fixator parameter, or the body constraint value.

2. The method of claim 1, wherein the fixator dimension value comprising a function of the critical load value in accordance with the design formula is selectable from: the fixator's width profile and the fixator's thickness profile.

3. The method of claim 1, wherein the plurality of design formulas are predetermined by carrying out numerical simulations.

4. The method of claim 1, wherein the body constraint value comprises a maximum limit of the fixator dimension value, and wherein the design formula is determined so as to also maximize the normalized difference between (a) the body constraint value and (b) the fixator dimension value.

5. The method of claim 1 wherein the formula library is pre-loaded on a computer-readable storage medium.

6. The method of claim 1, wherein the bone reference is a visualized simplified shape representing the one or more of the following features of the long bone: end plane, effective fracture plane, one or more surface areas of the long bone shaft, and the middle curvature of one or more surface areas of the long bone shaft.

7. The method of claim 1, wherein the fracture parameter includes: the type of long bone being fractured, the type of fracture, and the condition of fracture; said type of long bone being selectable from: clavicle, humerus, radius, ulna, femur, fibula, and tibia; said type of fracture being selectable from: simple and comminuted; and said condition of fracture being selectable from: new, malunion, and non-union.

8. The method of claim 1, wherein the bone fixation system comprises at least one of: a fixator and a surgical assisting kit, said fixator comprising a fastening zone wherein a plurality of fastening locations are located, said fastening locations being adapted to accommodate a plurality of fasteners; and said surgical assisting kit comprising one or more of a positioning guide and a drilling guide.

9. The method of claim 1, wherein the fixator parameter includes: the fixator's safety factor, the fixator's orientation, the fixator shape condition, the fixator's material, the fastening parameter, and the fixator dimension value.

10. The method of claim 9, wherein the fixator's orientation is one or a combination of anatomical position corresponding with the fixator, said anatomical position being selectable from: superior, inferior, anterior, antero-inferior, antero-medial, antero-lateral, lateral, and posterior.

11. The method of claim 9, wherein the fastening parameter is selectable from: the type of fastening locations, the number of fastening locations, and the constellation of fastening locations.

12. The method of claim 9, wherein the fixator dimension value is selectable from the fixator's length, the fastening zone's length, the distance between the fastening locations, the fixator's width profile, and the fixator's thickness profile.

13. The method of claim 8, wherein the fixator reference is a visualized simplified shape representing one or more of the following features of the fixator: end plane, middle curvature, cross-sectional plane, the fastening location's countersink plane, and the fastening location's axis.

14. The method of claim 8, wherein the body constraint value is selectable from: the fixator's maximum thickness limit, the fixator's maximum width limit, and the fastening zone's maximum length limit.

15. The method of claim 1, wherein the critical load value is selectable from: a bending moment, a torsion force, and an axial compression force.

16. The method of claim 1, wherein the critical load value is vectorial.

17. The method of claim 1, wherein the critical load value is a function of the bone dimension value, the fixator dimension value, and the physiologic loading parameter.

18. The method of claim 17, wherein the bone dimension value is selectable from: the long bone's effective fracture length, the length of the middle curvature of the long bone shaft's flat surface, and the long bone shaft's width profile in the perspective of relevant anatomical position.

19. The method of claim 17, wherein the bone dimension value is determined based on the bone reference.

20. The method of claim 17, wherein the physiologic loading parameter is based on a body parameter or an activity parameter.

21. The method of claim 1 wherein the method is computer-automated or computer-aided.

22. A method of generating a model for computer-aided manufacture of a bone fixation system, said model being based on at least the fixator reference and the fixator dimension value in accordance with claim 1.

23. The method of claim 22 which comprises modifying a fixator basic unit with at least the fixator reference and the fixator dimension value.

24. The method of claim 23, wherein the fixator basic unit comprises the pre-loaded (a) shape of the fixator's cross-section area and (b) shape of the fastening locations.

25. A process of manufacturing a bone fixation system in accordance with at least the model as claimed in claim 22.

26. A process in accordance with claim 25 which comprises additive manufacturing.

27. A bone fixation system that is configured in accordance with the method of claim 1, said system being for a fracture of a human's long bone shaft, said fracture forming an effective fracture length defined by one or more effective fracture border, said system comprising a fixator for supporting the long bone shaft; and a positioning guide, wherein:

said fixator comprises a plurality of fastening locations adapted to accommodate a plurality of fasteners for attaching the fixator to the long bone shaft; at least one border marker adapted to coincide substantially with the effective fracture border when the fixator has been attached to the long bone shaft; a high-load portion adapted to be free of the fastening location; and a thickness profile that is non-uniform and adapted so that the strength of fixator is substantially at a predetermined safety factor, said fixator has patient-specific configuration, and said positioning guide comprises at least one fixator-end marker adapted to coincide substantially with one end of the fixator; a plurality of fastening markers adapted to coincide substantially with the fastening locations; and at least one bone-end marker adapted to coincide substantially with a predetermined position of the long bone end when the fixator has been attached to the long bone shaft.

28. The system of claim 27, wherein the patient-specific configuration includes one or more of: the outline, the thickness profile, the number of fastening locations, the position of fastening locations, and the position of border markers.

29. The system of claim 27, wherein the fixator comprises a width profile that is non-uniform and adapted so that the strength of the fixator is substantially at said predetermined safety factor.

30. The system of claim 27, wherein the bone-end marker is of a substantially spherical shape.

31. The system of claim 27, wherein the fastening locations are holes and the fasteners are screws.

32. The system of claim 31, further comprising one or more drilling guide adapted to be temporarily fitted on a surface area of the long bone shaft, said drilling guide having an opening so as to allow a drilling means of predetermined dimension to pass therethrough.

33. The system of claim 32, wherein the drilling guide comprises a primary base adapted to be temporarily fitted on the surface area of the long bone shaft, and a secondary base adapted to have an opening so as to allow a drilling means of predetermined dimension to pass therethrough, and wherein said primary base and said secondary base are adapted to be detachably attached to each other.

34. The system of claim 32, wherein the drilling guide is further adapted to have a contacting surface which substantially corresponds with the surface area of the long bone shaft.

35. The system of claim 32, wherein the drilling guide is further adapted to engage one end of the fixator.

36. The system of claim 32, wherein the drilling guide further comprises a drill-stopping element so as to allow the drilling means to pass therethrough up to a predetermined distance.

37. The system of claim 27, wherein the fixator further comprises one or more pilot fastening location adapted accommodate a pilot fastener, and wherein the fastening locations are holes and the fasteners are screws, said system further comprising one or more drilling guides adapted to be temporarily fitted on a surface area of the long bone shaft, said drilling guide having a pre-drilling opening so as to allow a drilling means of predetermined dimension to pass therethrough; and a pilot opening so as to allow a pilot fastener of predetermined dimension to pass therethrough.

38. The system of claim 27, wherein the fixator-end marker, the fastening markers, and the bone-end marker are radiopaque.

39. The system of claim 27, wherein the human long bone is a clavicle.

* * * * *